United States Patent
Merrill et al.

(10) Patent No.: US 11,066,551 B2
(45) Date of Patent: Jul. 20, 2021

(54) ORIENTED POLYLACTIC ACID POLYMER BASED FILM

(71) Applicant: 3M INNOVATIVE PROPERTIES COMPANY, St. Paul, MN (US)

(72) Inventors: William W. Merrill, Mahtomedi, MN (US); Jeffrey P. Kalish, St. Paul, MN (US); Pamela A. Percha, Woodbury, MN (US); Derek J. Dehn, Maplewood, MN (US); Bradley L. Givot, St. Paul, MN (US); Ignatius A. Kadoma, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 147 days.

(21) Appl. No.: 16/099,741

(22) PCT Filed: May 4, 2017

(86) PCT No.: PCT/US2017/031043
§ 371 (c)(1),
(2) Date: Nov. 8, 2018

(87) PCT Pub. No.: WO2017/200756
PCT Pub. Date: Nov. 23, 2017

(65) Prior Publication Data
US 2019/0136045 A1    May 9, 2019

Related U.S. Application Data

(60) Provisional application No. 62/339,432, filed on May 20, 2016, provisional application No. 62/352,643, filed on Jun. 21, 2016.

(51) Int. Cl.
| | | |
|---|---|---|
| B32B 27/36 | (2006.01) | |
| C08L 67/04 | (2006.01) | |
| C08J 5/18 | (2006.01) | |
| B32B 27/30 | (2006.01) | |
| B32B 27/22 | (2006.01) | |
| C08J 7/043 | (2020.01) | |
| B32B 27/08 | (2006.01) | |

(52) U.S. Cl.
CPC .............. *C08L 67/04* (2013.01); *B32B 27/08* (2013.01); *B32B 27/22* (2013.01); *B32B 27/306* (2013.01); *B32B 27/36* (2013.01); *C08J 5/18* (2013.01); *C08J 7/043* (2020.01); *B32B 2270/00* (2013.01); *B32B 2307/514* (2013.01); *B32B 2307/516* (2013.01); *B32B 2307/518* (2013.01); *B32B 2307/582* (2013.01); *B32B 2307/704* (2013.01); *C08J 2367/04* (2013.01); *C08J 2429/14* (2013.01); *C08J 2431/04* (2013.01); *C08L 2203/16* (2013.01); *C08L 2205/06* (2013.01)

(58) Field of Classification Search
None
See application file for complete search history.

(56) References Cited

U.S. PATENT DOCUMENTS

| | | |
|---|---|---|
| 3,011,988 A | 12/1961 | Luedke |
| 4,950,258 A | 8/1990 | Kawai |
| 5,032,460 A | 7/1991 | Kantner |
| 5,216,050 A | 6/1993 | Sinclair |
| 5,296,277 A | 3/1994 | Wilson |
| 5,443,780 A | 8/1995 | Matsumoto |
| 5,502,158 A | 3/1996 | Sinclair |
| 5,536,807 A | 7/1996 | Gruber |
| 5,623,010 A | 4/1997 | Groves |
| 5,663,288 A | 9/1997 | Shinoda |
| 5,677,376 A | 10/1997 | Groves |
| 5,686,504 A | 11/1997 | Ang |
| 5,698,279 A | 12/1997 | Vicik |
| 5,726,220 A | 3/1998 | Tokushige |
| 5,798,436 A | 8/1998 | Gruber |
| 5,814,685 A | 9/1998 | Satake |
| 5,883,199 A | 3/1999 | McCarthy |

(Continued)

FOREIGN PATENT DOCUMENTS

| | | |
|---|---|---|
| CN | 101104779 | 1/2008 |
| CN | 101397394 | 4/2009 |
| CN | 102099186 | 6/2011 |
| CN | 103265798 | 8/2013 |
| DE | 202006001693 | 3/2006 |
| EP | 0373646 | 6/1990 |
| EP | 0587069 | 3/1994 |
| JP | 04242109 | 8/1992 |
| JP | 09151310 | 6/1997 |
| JP | 2000-289169 | 10/2000 |
| JP | 2004-010843 | 1/2004 |
| JP | 2005-143413 | 6/2005 |
| JP | 2007-216541 | 8/2007 |

(Continued)

OTHER PUBLICATIONS

Jeffrey Gotto, "PolyLactic Acid (PLA) is Gaining Traction in the market", Polymer Innovation Blog, retrieved on Sep. 15, 2020 (Year: 2020).*

(Continued)

*Primary Examiner* — Anish P Desai
(74) *Attorney, Agent, or Firm* — Carolyn A. Fischer

(57) ABSTRACT

In one embodiment, a film is described comprising a mixture of semicrystalline polylactic acid polymer; polyvinyl acetate polymer having a glass transition temperature (Tg) midpoint as measured by differential scanning calorimetry of at least 25° C.; and plasticizer; wherein the film is oriented. In another embodiment, a film is described comprising a mixture comprising semicrystalline polylactic acid polymer, polymer having a midpoint Tg as measured by differential scanning calorimetry of at least 25° C., and plasticizer; wherein the mixture exhibits a single midpoint Tg and the single midpoint Tg ranges from 40° C. to 65° C.; and wherein the film is oriented and the oriented film exhibits a higher midpoint Tg ranging from 40° C. to 65° C. and a lower midpoint Tg ranging from 5 to 25° C.

16 Claims, 4 Drawing Sheets

(56) References Cited

U.S. PATENT DOCUMENTS

| | | | |
|---|---|---|---|
| 6,005,068 A | 12/1999 | Gruber | |
| 6,113,679 A | 9/2000 | Adkins | |
| 6,114,495 A | 9/2000 | Kolstad | |
| 6,121,410 A | 9/2000 | Gruber | |
| 6,136,905 A | 10/2000 | Suzuki | |
| 6,143,863 A | 11/2000 | Gruber | |
| 6,160,084 A | 12/2000 | Langer | |
| 6,232,359 B1 | 5/2001 | Christian | |
| 6,294,249 B1 | 9/2001 | Hamer | |
| 6,323,308 B1 | 11/2001 | Kobayashi | |
| 6,498,202 B1 | 12/2002 | Sun | |
| 6,534,172 B1 | 3/2003 | Kawashima | |
| 6,600,008 B1 | 7/2003 | Kobayashi | |
| 6,649,732 B2 | 11/2003 | Kobayashi | |
| 6,846,075 B2 | 1/2005 | Ylitalo | |
| 6,869,985 B2 | 3/2005 | Mohanty | |
| 6,881,458 B2 | 4/2005 | Ludwig | |
| 6,949,212 B2 | 9/2005 | Merrill | |
| 7,025,453 B2 | 4/2006 | Ylitalo | |
| 7,371,799 B2 | 5/2008 | Mather | |
| 7,385,020 B2 | 6/2008 | Anderson | |
| 8,158,731 B2 | 4/2012 | Stefanisin | |
| 8,178,190 B2 | 5/2012 | Savagian | |
| 8,512,852 B2 | 8/2013 | Shimizu | |
| 8,530,021 B2 | 9/2013 | Bartusiak | |
| 8,748,543 B2 | 6/2014 | Masuda | |
| 8,883,290 B2 | 11/2014 | Lowe | |
| 9,096,782 B2 | 8/2015 | Takahira | |
| 9,175,181 B2 | 11/2015 | Butler | |
| 2002/0094444 A1 | 7/2002 | Nakata | |
| 2003/0021973 A1 | 1/2003 | Topolkaraev | |
| 2003/0215628 A1 | 11/2003 | Ma | |
| 2003/0216496 A1 | 11/2003 | Mohanty | |
| 2004/0005136 A1* | 1/2004 | Okumura | G02B 1/105 385/147 |
| 2004/0068059 A1 | 4/2004 | Katayama | |
| 2004/0122174 A1* | 6/2004 | Mather | C08G 18/3893 525/191 |
| 2004/0127650 A1 | 7/2004 | De Koning | |
| 2005/0112352 A1 | 5/2005 | Laney | |
| 2005/0175833 A1 | 8/2005 | Yoneda | |
| 2006/0188706 A1 | 8/2006 | Kobayashi | |
| 2006/0257676 A1 | 11/2006 | Itada | |
| 2006/0269710 A1 | 11/2006 | Inglis | |
| 2007/0255013 A1 | 11/2007 | Becraft | |
| 2009/0018237 A1 | 1/2009 | Fujii | |
| 2009/0123728 A1 | 3/2009 | Cheung | |
| 2009/0152095 A1 | 6/2009 | Kawahara | |
| 2009/0162683 A1 | 6/2009 | Douard | |
| 2010/0013121 A1 | 1/2010 | Hashimoto | |
| 2010/0040904 A1 | 2/2010 | Cloutier | |
| 2010/0316845 A1 | 12/2010 | Rule | |
| 2011/0086998 A1 | 4/2011 | Kusunoki | |
| 2011/0091666 A1 | 4/2011 | Wang | |
| 2011/0196076 A1 | 8/2011 | Yoshino | |
| 2011/0207858 A1 | 8/2011 | Pfaadt | |
| 2011/0224342 A1 | 9/2011 | Masuda | |
| 2011/0244185 A1 | 10/2011 | Dou | |
| 2011/0244186 A1 | 10/2011 | Dou | |
| 2011/0256338 A1 | 10/2011 | Ausen | |
| 2011/0287237 A1 | 11/2011 | Riebel | |
| 2012/0122745 A1 | 5/2012 | Mullen | |
| 2012/0135169 A1 | 5/2012 | Tangelder | |
| 2012/0149844 A1 | 6/2012 | Whitehouse | |
| 2012/0211918 A1 | 8/2012 | Ausen | |
| 2012/0270978 A1* | 10/2012 | Myers | C08K 5/11 524/310 |
| 2012/0296015 A1 | 11/2012 | Van Heemst | |
| 2012/0315454 A1 | 12/2012 | Wang | |
| 2013/0156946 A1 | 6/2013 | Wada | |
| 2013/0184386 A1 | 7/2013 | Coudyser | |
| 2013/0236723 A1 | 9/2013 | Ishiguro | |
| 2013/0273353 A1 | 10/2013 | Ting | |
| 2013/0310288 A1 | 11/2013 | Mullen | |
| 2014/0138025 A1 | 5/2014 | Bartusiak | |
| 2014/0272357 A1* | 9/2014 | He | C08L 67/04 428/219 |
| 2015/0037526 A1 | 2/2015 | Seth | |
| 2015/0361231 A1 | 12/2015 | Li | |
| 2016/0304751 A1 | 10/2016 | Mussig | |
| 2017/0313912 A1* | 11/2017 | Zhou | C08L 31/04 |
| 2018/0297342 A1 | 10/2018 | Pailler | |
| 2019/0099991 A1 | 4/2019 | Zhou | |
| 2019/0136045 A1 | 5/2019 | Merrill | |
| 2019/0185662 A1* | 6/2019 | Zhou | B32B 27/302 |
| 2019/0218423 A1* | 7/2019 | Bartusiak | C08L 67/04 |
| 2019/0256677 A1 | 8/2019 | Fishman | |
| 2019/0284351 A1 | 9/2019 | Yaguchi | |
| 2019/0284357 A1* | 9/2019 | Merrill | B32B 27/304 |

FOREIGN PATENT DOCUMENTS

| | | |
|---|---|---|
| JP | 2007-217513 | 8/2007 |
| JP | 2009-107669 | 5/2009 |
| JP | 2011-006615 | 1/2011 |
| JP | 2011-136428 | 7/2011 |
| JP | 2012-192636 | 1/2012 |
| JP | 2013-001024 | 1/2013 |
| JP | 2014-001261 | 1/2014 |
| JP | 2015-120807 | 7/2015 |
| WO | WO 1990-001521 | 2/1990 |
| WO | WO 1992-004413 | 3/1992 |
| WO | WO 1994-006856 | 3/1994 |
| WO | 1994-007949 | 4/1994 |
| WO | WO 1998-015601 | 4/1998 |
| WO | WO 1998-029516 | 7/1998 |
| WO | WO 1998-040434 | 9/1998 |
| WO | WO 1999-003907 | 1/1999 |
| WO | WO 2004/033539 | 4/2004 |
| WO | WO 2007-027163 | 3/2007 |
| WO | WO 2007-084291 | 7/2007 |
| WO | WO 2008-051443 | 5/2008 |
| WO | WO 2008-130225 | 10/2008 |
| WO | WO 2009/120311 | 10/2009 |
| WO | WO 2010-055903 | 5/2010 |
| WO | WO 2010-078134 | 7/2010 |
| WO | WO 2010-088067 | 8/2010 |
| WO | WO 2010-118041 | 10/2010 |
| WO | WO 2010-151558 | 12/2010 |
| WO | WO 2011-060001 | 5/2011 |
| WO | WO 2011-082052 | 7/2011 |
| WO | WO 2011-123682 | 10/2011 |
| WO | WO 2012-148421 | 11/2012 |
| WO | WO 2013/031755 | 3/2013 |
| WO | WO 2013-093781 | 6/2013 |
| WO | WO 2013-118023 | 8/2013 |
| WO | WO 2013-184822 | 12/2013 |
| WO | WO 2014-061243 | 4/2014 |
| WO | WO 2014-172185 | 10/2014 |
| WO | WO 2014-176509 | 10/2014 |
| WO | WO 2015-157350 | 10/2014 |
| WO | WO 2015-071447 | 5/2015 |
| WO | WO 2016-105998 | 6/2016 |
| WO | WO 2017-105887 | 6/2017 |
| WO | WO 2017-112386 | 6/2017 |
| WO | WO 2017-142730 | 8/2017 |
| WO | WO 2017-200756 | 11/2017 |
| WO | WO 2017-222824 | 12/2017 |
| WO | WO 2017-222863 | 12/2017 |

OTHER PUBLICATIONS 3M (TM) Screen printing ink 1905 Black, 2016, pp. 03.
3M (TM) Screen printing UV Ink 9802 Opaque Black, 2016, pp. 02-03.
Anderson, "Toughening Polylactide", Polymer reviews, 2008, vol. 48, pp. 85-108.
El-Hadi, "Effect of processing conditions on the development of morphological features of banded or nonbanded spherulites of poly(3-hydroxybutyrate) (PHB) and polylactic acid (PLLA) blends", Polymer engineering and science, 2011, pp. 2191-2202.
FG00099—Vutek® GSLXR 3M Superflex Ink, 2015, pp. 03.

(56) References Cited

OTHER PUBLICATIONS

Gajria, "Miscibility and Biodegradability of Blends of Poly (Lactic Acid) and Poly (Vinyl Acetate)," Polymer, Feb. 1996, vol. 37, No. 3, pp. 437-444.
Gottfried, "Principles of Aging", Resistance and Stability of Polymers, 2013, pp. 01-138.
Hansen,"Vae Based Polymers for Biobased Products", Wacker Polymers, 2011, pp. 01-23.
Hong, "Miscibility and Physical Properties of Poly (Lactic Acid) (PLA) and Poly (Vinyl Acetate) (PVAc) Blends," Polymeric Materials: Science & Engineering, 2009, vol. 101, pp. 960-961.
HP Safety Data Sheet, C4940 Series, 9380 Version No. 02, 2015, 1 page.
Jamshidian, "Poly-Lactic Acid: Production, Applications, Nanocomposites, and Release Studies," Comprehensive Reviews in Food Science and Food Safety, Sep. 2010, vol. 9, No. 5, pp. 552-571.
Kasai, "Nucleating Agents for Inducing the Crystallization of PLA—Ecopromote,", Innovation Takes Root Conference, 2012, 35 pages.
Levamelt, "Protection Energized by Lanxess", Product Brochure, 16 pages.
Lim, "Processing Technologies for Poly (Lactic Acid)," Progress in Polymer Science, Aug. 2008, vol. 33, No. 8, pp. 820-852.
Material Safety Data Sheet, The Hallstar Company, 3 pages.
Mulligan, "Nonlinear mechanooptical behaviour of uniaxially stretched poly(lactic acid): Dynamic phase behaviour", Macromolecules, 2005, vol. 38, pp. 2333-2344.
Natureworks LLC, "Ingeo Biopolymer 2003D Technical Data Sheet for Fresh Food Packaging and Food Serviceware", 3 pages.
Natureworks LLC, "Ingeo Biopolymer 4032D Technical Data Sheet, Biaxially Oriented Films—High Heat", 3 pages.
Randall,"Enhancing Performance of Biopolymers Through Polymer and Formulation Design", NatureWorks LLC, Bioplastics Compounding and Processing, May 2012, 39 pages.
Roland Data Sheet,"ECO-SOL MAX2, ESL4-CY, ECO-SOL MAX2, ESL4-4CY, v.G_5.0", Dec. 21, 2015, 1 page.
Roland, "ECO-SOL MAX2, ESL4-CY and ECO-SOL MAX2,ESL4-4CY", 2015, 1page.
Shin, "Miscibility of biodegradable aliphatic polyester and poly(vinyl acetate) blends", J. Appl. Polym Sci, 2000, vol. 77, pp. 1348-1352.
Sivalingam, "Blends of poly($\epsilon$-caprolactone) and poly(vinyl acetate): mechanical properties and thermal degradation, Polymer degradation and stability", 2004, vol. 84, pp.345-351.
Sivalingam, "Enzymatic degradation of poly ($\epsilon$-caprolactone) and poly(vinyl acetate) and their blends by lipases", Chemical Engineering Science, 2003, vol. 58,pp. 2911-2919.
Suryanegara, "The Synergetic Effect of Phenylphosphonic Acid Zinc and Microfibrillate Cellulose on the Injection Molding Cycle Time of PLA Composites," Cellulose, Jun. 2011, vol. 18, No. 3, pp. 689-698.
Synbra, Datasheet: Good flow: Compounding, Synterra® PDLA 1010, Version: 2012-07, 1 page.
Synbra, Datasheet: High Molecular Weight for Extrusion, Synterra® 78PDLA 1510, Version: 2012-07, 1 page.
Trejo, "Fungal degradation of polyvinyl acetate", Ecotoxicology and environmental safety, 1988, vol. 16, pp. 25-35.
Tsai, "Crystallinity and dimensional stability of biaxial oriented poly(lactic acid) films", Polymer degradation and stability, 2010, vol. 95, pp. 1292-1298.
Tsuji, "Isothermal and Non-Isothermal Crystallization Behavior of Poly(L-Lactic Acid): Effects of Stereocomplex as Nucleating Agent", Polymer, 2006, vol. 47, No. 15, pp. 5430.
Tsuji, "Water vapor permeability of poly(lactide)s: Effects of molecular characterstics and crystallinity", Journal of applied polymer science, 2006, vol. 99, pp. 2245-2252.
Vertellus, "Citroflex® A-4 Technical Data Sheet", Vertellus Specialties Inc. 2006, 2 pages.
Wacker Polymers, Technical Data Sheet for Vinnapas UW 4 FS, 2010, 2 pages.
Wacker,"Vinnex—Enabling the Next Generation of Bioplastics", 24 pages.
International Search report for PCT International Application No. PCT/US2017/031043 dated Aug. 17, 2017, 5 pages.
ASTM D882-10, "Standard Test Method for Tensile Properties of Thin Plastic Sheeting," downloaded Jan. 21, 2020, 10 pages.
Aldrich Data Sheet (Year: 2019), Reference Polymer Properties.
Brüggemann, Oliver, "Polyvinylacetate," RöMPP online, Dec. 31, 2009, XP 055591580, retrieved from the Internet: https//roempp.thieme.de/roempp4.0/data/RD-16-03642 [retrieved on May 24, 2019], 2 pages.
Krouse, "Stereocomplex Formation Between Enantiomeric Poly(lactides)", Macromolecules, 1987, vol. 20, No. 4, pp. 904-906.
"*Vertellus*—Citorflex A-4 Plasticizer" (http://www.vertellus.com/products/plastics-polymers/citroflex-plasticizers/citroflex-a-4-plasticizer-acetyl-tributyl-citrate) (webpage retrieved Apr. 27, 2019) (Year: 2019).
"*Wikipedia*—Polylactic Acid" (https://en.wikipedia.org/wiki/Polyactic_acid) (webpage retrieved Dec. 8, 2018) (Year: 2018).
International Search Report for PCT International Application No. PCT/US2015/065557, dated Mar. 14, 2016, 5 pages.
International Search report for PCT International Application No. PCT/US2016/064897 dated Mar. 17, 2017, 6 pages.
International Search Report for PCT International Application No. PCT/US2017/016699, dated Jul. 11, 2017, 5 pages.
International Search report for PCT International Application No. PCT/US2017/036686 dated Sep. 11, 2017, 4 pages.
Ikada, "Stereocomplex Formation Between Enantiomeric Poly(lactides)", Macromolecules, 1987, vol. 20, No. 04, pp. 904-906.
Natureworks LLC, "Ingeo Resin Product Guide", 2 pages.
Vinnapas, Technical data sheet, 2010, 2 pages.
Wacker Biosolutions, Technical Data Sheet for Vinnex 2510, 2 pages.
Wacker Polymers—Vinnapas (5279e) (Jun. 2006) (Year: 2006).
Wacker Polymers—Vinnex (7002E) (Aug. 2013) (Year: 2013).
Wacker Polymers—Vinnapas (6766E) (May 2011) (Year: 2011).

\* cited by examiner

ORIENTED POLYLACTIC ACID POLYMER BASED FILM

CROSS REFERENCE TO RELATED APPLICATIONS

This application is a national stage filing under 35 U.S.C. 371 of PCT/US2017/031043, filed May 4, 2017, which claims the benefit of U.S. Provisional Application No. 62/339,432, filed May 20, 2016, and U.S. Provisional Application No. 62/352,643, filed Jun. 21, 2016, the disclosure of which is incorporated by reference in its/their entirety herein.

SUMMARY

In one embodiment, a film is described comprising a mixture of semicrystalline polylactic acid polymer; polyvinyl acetate polymer having a glass transition temperature (Tg) midpoint as measured by differential scanning calorimetry of at least 25° C.; and plasticizer; wherein the film is oriented.

In another embodiment, a film is described comprising a mixture comprising semicrystalline polylactic acid polymer, polymer having a midpoint Tg as measured by differential scanning calorimetry of at least 25° C., and plasticizer; wherein the mixture exhibits a single midpoint Tg and the single midpoint Tg ranges from 40° C. to 65° C.; and wherein the film is oriented and the oriented film exhibits a higher midpoint Tg ranging from 40° C. to 65° C. and a lower midpoint Tg ranging from 5 to 25° C.

DETAILED DESCRIPTION

Figure 1:
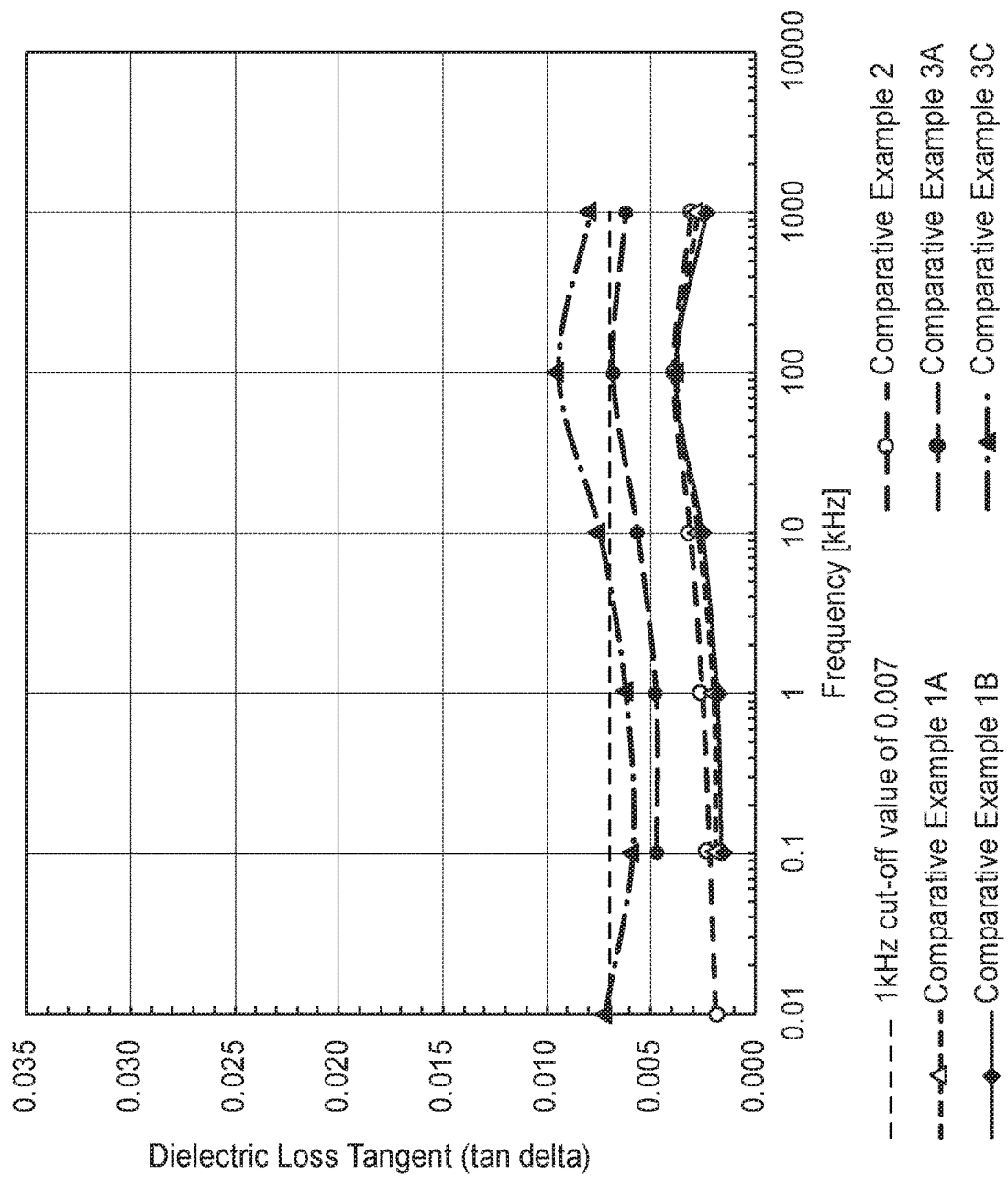
FIG. 1 are the dielectric loss tangent as a function of frequency of various comparative oriented films.

Presently described are oriented films comprising a polylactic acid polymer. The oriented film may be a monolithic film or a film layer of a multilayer film.

Lactic acid is a renewable material obtained by the bacterial fermentation of corn starch or cane sugar, and thus is considered a natural or in other words "biomass" material. Lactic acid has two optical isomers: L-lactic acid (also known as (S)-lactic acid) and D-lactic acid (also known as (R)-lactic acid), depicted as follows:

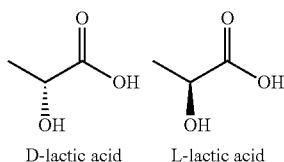

D-lactic acid    L-lactic acid

Polyesterification of lactic acid affords polylactic acid (PLA) polymer.

More typically, lactic acid is typically converted to the cyclic lactide monomer, and the lactide undergoes ring opening polymerization, such as depicted as follows:

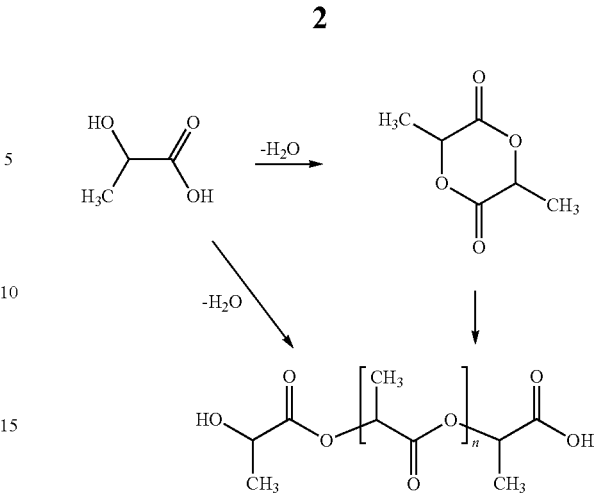

The resulting polymer material is typically referred to as polylactide polymer or poly(lactic acid) polymer.

The degree of crystallinity, and hence many important properties, is largely controlled by the ratio of D and/or meso-lactide to L cyclic lactide monomer used. Likewise, for polymers prepared by direct polyesterification of lactic acid, the degree of crystallinity is largely controlled by the ratio of polymerized units derived from D-lactic acid to polymerized units derived from L-lactic acid.

The oriented films of the articles described herein generally comprise at least one semicrystalline PLA polymer alone or in combination with at least one amorphous PLA polymer. The term "semicrystalline PLA" refers to a PLA polymer having the ability to develop crystallinity. Both the semicrystalline and amorphous PLA polymers generally comprise high concentrations of polymerized units derived from L-lactic acid (e.g. L-lactide) with low concentrations of polymerized units derived from D-lactic acid (e.g. D-lactide).

The semicrystalline PLA polymer typically comprises at least 90, 91, 92, 93, 94, or 95 wt.-% of polymerized units derived from L-lactic acid (e.g. L-lactide) and no greater than 10, 9, 8, 7, 6, or 5 wt.-% of polymerized units derived from D-lactic acid (e.g. D-lactide and/or meso-lactide). In yet other embodiments, the semicrystalline PLA polymer comprises at least 96 wt.-% of polymerized units derived from L-lactic acid (e.g. L-lactide) and less than 4, 3, or 2 wt.-% of polymerized units derived from D-lactic acid (e.g. D-lactide and/or meso-lactide. Likewise the film comprises an even lower concentration of polymerized units derived from D-lactic acid (e.g. D-lactide and/or meso-lactide) depending on the concentration of semicrystalline PLA polymer in the film. For example, if the film composition comprises 15 wt.-% of a semicrystalline PLA having about 2 wt.-% D-lactide and/or meso-lactide, the film composition comprises about 0.3 wt.-% D-lactide and/or meso-lactide. The film generally comprises no greater than 9, 8, 7, 6, 5, 4, 3, 2, 1.5, 1.0, 0.5, 0.4, 0.3, 0.2, or 0.1 wt.-% polymerized units derived from D-lactic acid (e.g. D-lactide and/or meso-lactide). Suitable examples of semicrystalline PLA include Natureworks™ Ingeo™ 4042 D and 4032D. These polymers have been described in the literature as having molecular weight (Mw) of about 200,000 g/mole; Mn of about 100,000 g/mole; and a polydispersity of about 2.0.

Alternatively, the semicrystalline PLA polymer may comprises at least 90, 91, 92, 93, 94, or 95 wt.-% of polymerized units derived from D-lactic acid (e.g. D-lactide) and no greater than 10, 9, 8, 7, 6, or 5 wt.-% of polymerized units derived from L-lactic acid (e.g. L-lactide and/or meso-lactide). In yet other embodiments, the semicrystalline PLA polymer comprises at least 96 wt.-% of polymerized units derived from D-lactic acid (e.g. D-lactide) and less than 4, 3, or 2 wt.-% of polymerized units derived from L-lactic acid (e.g. L-lactide and/or meso-lactide. Likewise the film comprises an even lower concentration of polymerized units derived from L-lactic acid (e.g. L-lactide and/or meso-lactide) depending on the concentration of semicrystalline PLA polymer in the film. For example, if the film composition comprises 15 wt.-% of a semicrystalline PLA having about 2 wt.-% L-lactide and/or meso-lactide, the film composition comprises about 0.3 wt.-% L-lactide and/or meso-lactide. The film generally comprises no greater than 9, 8, 7, 6, 5, 4, 3, 2, 1.5, 1.0, 0.5, 0.4, 0.3, 0.2, or 0.1 wt.-% polymerized units derived from L-lactic acid (e.g. L-lactide and/or meso-lactide). Examples of such semicrystalline PLA are available as "Synterra™ PDLA".

The oriented film composition may optionally further comprise an amorphous PLA polymer blended with the semicrystalline PLA. The amorphous PLA typically comprises no more than 90 wt.-% of polymerized units derived from L-lactic acid and greater than 10 wt.-% of polymerized units derived from D-lactic acid (e.g. D-lactide and/or meso-lactide). In some embodiments, the amorphous PLA comprises at least 80 or 85 wt.-% of polymerized units derived from L-lactic acid (e.g. L-lactide). In some embodiments, the amorphous PLA comprises no greater than 20 or 15 wt.-%. of polymerized units derived from D-lactic acid (e.g. D-lactide and/or meso-lactide). A suitable amorphous PLA includes Natureworks™ Ingeo™ 4060 D grade. This polymer has been described in the literature to have a molecular weight Mw of about 180,000 g/mole.

Alternatively, the amorphous PLA typically comprises no more than 90 wt.-% of polymerized units derived from D-lactic acid and greater than 10 wt.-% of polymerized units derived from L lactic acid (e.g. L-lactic lactide and/or meso-lactide). In some embodiments, the amorphous PLA comprises at least 80 or 85 wt.-% of polymerized units derived from D-lactic acid (e.g. D-lactide). In some embodiments, the amorphous PLA comprises no greater than 20 or 15 wt.-%. of polymerized units derived from L-lactic acid (e.g. L-lactide and/or meso-lactide).

The PLA polymers are typically considered homopolymers. However, the PLA polymer may optionally comprise relatively low concentrations of repeat units derived from other comonomers, provided that the Tg of the PLA polymer is within the ranges described herein and that the PLA polymer is semicrystalline. The total concentration of repeats derived from other comonomers of the PLA polymer is typically no greater than 10, 9, 8, 7, 6, or 5 wt.-%. In some embodiments, the concentration of repeats derived from other comonomers of the PLA polymer is typically no greater than 4, 3, 2, 1 or 0.5 wt.-%.

The PLA polymers are preferably "film grade" polymers, having a melt flow rate (as measured according to ASTM D1238) of no greater than 25, 20, 15, or 10 g/min at 210° C. with a mass of 2.16 kg. In some embodiments, the PLA polymer has a melt flow rate of less than 10 or 9 g/min at 210° C. The melt flow rate is related to the molecular weight of the PLA polymer. The PLA polymer typically has a weight average molecular weight (Mw) as determined by Gel Permeation Chromatography with polystyrene standards of at least 50,000 g/mol; 75,000 g/mol; 100,000 g/mol; 125,000 g/mol; 150,000 g/mol. In some embodiments, the molecular weight (Mw) is no greater than 400,000 g/mol; 350,000 g/mol or 300,000 g/mol.

The PLA polymers typically have a tensile strength ranging from about 25 to 150 MPa; a tensile modulus ranging from about 1000 to 7500 MPa; and a tensile elongation of at least 3, 4, or 5 ranging up to about 10 or 15%. In some embodiments, the tensile strength at break of the PLA polymer is at least 30, 35, 40, 45, or 50 MPa. In some embodiments, the tensile strength of the PLA polymer is no greater than 125, 100, or 75 MPa. In some embodiments, the tensile modulus of the PLA polymer is at least 1500, 2000, 2500, or 3000 MPa. In some embodiments, the tensile modulus of the PLA polymer is no greater than 7000, 6500, 6000, 5500, 5000, or 4000 MPa. Such tensile and elongation properties can be determined by ASTM D882 and are typically reported by the manufacturer or supplier of such PLA polymers.

The PLA polymers generally have a glass transition temperature (Tg) midpoint (half-height) as determined by Differential Scanning calorimetry (DSC), according to the test method described in the examples, ranging from about 50 to 65° C. In some embodiments, the Tg midpoint (half-height) is at least 51, 52, 53, 54, or 55° C.

The semicrystalline PLA polymers typically have a (e.g. peak maximum) melting point ranging from 140 to 175° C., 180° C., 185° C. or 190° C. In some embodiments, the (e.g. peak maximum) melting point is at least 145, 150, or 155° C. The PLA polymer, typically comprising a semicrystalline PLA alone or in combination with an amorphous PLA polymer can be melt-processed at temperatures of 180, 190, 200, 210, 220 or 230° C.

In one embodiment, PLA polymers can crystallize to form a stereocomplex (*Macromolecules,* 1987, 20 (4), pp 904-906). The PLA stereocomplex is formed when PLLA (a PLA homopolymer polymerized from mostly L-lactic acid or L-lactide units) is blended with PDLA (a PLA homopolymer polymerized from mostly D-lactic acid or D-lactide units). The stereocomplex crystal of PLA is of interest because the melting temperature of this crystal ranges from 210-250° C. The higher melting temperature stereocomplex PLA crystals increase the thermal stability of the PLA-based material. The PLA stereocomplex crystal is also know to effectively nucleate PLA homopolymer crystallization (*Polymer,* Volume 47, Issue 15, 12 Jul. 2006, Page 5430). This nucleation effect increases the overall percent crystallinity of the PLA-based material, thus increasing the material's thermal stability.

The oriented film composition typically comprises a semicrystalline PLA polymer or a blend of semicrystalline and amorphous PLA in an amount of at least 40, 45 or 50 wt.-%, based on the total weight of the PLA polymer, second (e.g. polyvinyl acetate) polymer, and plasticizer. The total amount of PLA polymer is typically less than 90 or 85 wt. % and in some embodiments less than 80, 79, 78, 77, 76, or 75 wt.-% of the total weight of the PLA polymer, second (e.g. polyvinyl acetate) polymer, and plasticizer. When the oriented film or film layer comprises little or no additives, the total oriented film or film layer can also comprise the concentration of PLA polymer just described.

When the oriented film composition comprises a blend of at least one semicrystalline and at least one amorphous PLA, the amount of semicrystalline PLA is typically at least 50, 55 or 60 wt.-%, based on the total weight of the PLA polymer, second (e.g. polyvinyl acetate) polymer, and plasticizer. In some embodiments, the amount of amorphous PLA polymer ranges from 5, 10, or 15 wt.-% up to 30, 35 or 40 wt.-% based on the total weight of the PLA polymer, second (e.g. polyvinyl acetate) polymer, and plasticizer.

The oriented film composition further comprises at least one second polymer, such as polyvinyl acetate polymer. Without intending to be bound by theory, the second polymer is believed to be miscible with the PLA polymer, the plasticizer, or the combination thereof. The inclusion of the second (e.g. polyvinyl acetate) polymer can improve the compatibility of the PLA with a plasticizer such that the plasticizer concentration can be increased without plasticizer migration (as described in 75839WO003). The inclusion of the second polymer (e.g. polyvinyl acetate) in combination with the plasticizer can also reduce the haze and reduce the shrinkage of the resulting (e.g. biaxially) oriented film. The inclusion of the second polymer (e.g. polyvinyl acetate) in combination with the plasticizer can also reduce the dielectric loss tangent of the resulting (e.g. biaxially) oriented film. Many PLA-based films have been described as being "noisy." A film with a lower dielectric loss tangent is less noisy, or in other words a quieter film when flexed or handled.

The second (e.g. polyvinyl acetate) polymer generally has a midpoint (half-height) Tg determined by Differential Scanning calorimetry (DSC) according to the test method described in the examples of greater than 0, 5 or 10° C. and more typically a Tg of at least 15, 20, 25, 30, 35 or 40° C. The midpoint (half-height) Tg of the second (e.g. polyvinyl acetate) polymer is typically no greater than 80, 75, 70, 65, 60, 55, 50 or 45° C.

The second (e.g. polyvinyl acetate) polymer typically has a weight or number average molecular weight (measured using Gel Permeation Chromatography (GPC), as calibrated using polystyrene (PS) standards)) of greater than 25,000 g/mole, 30,000 g/mole, 35,000 g/mole, 40,000 g/mole, or 45,000 g/mole. In some embodiments, the molecular weight of the second (e.g. polyvinyl acetate) polymer is at least 50,000 g/mole, 55,000 g/mole, or 60,000 g/mole. PLA-based films comprising polyvinyl acetate polymer having a molecular weight of 15,000 or 25,000 g/mole can become tacky over time and have a tendency to block. This tendency may be overcome by addition of antiblocking agent. However, the inclusion of antiblocking agents can increase the haze.

In some embodiments, the molecular weight of the second (e.g. polyvinyl acetate) polymer is at least 75,000 g/mol; 100,000 g/mol; 125,000 g/mol; 150,000 g/mol. In other embodiments, the molecular weight of the second (e.g. polyvinyl acetate) polymer is at least 175,000 g/mol; 200,000 g/mol; 225,000 g/mol or 250,000 g/mol. In some embodiments, molecular weight of the second (e.g. polyvinyl acetate) polymer is no greater than 2,000,000 g/mol, 1,500,000 g/mol, 1,000,000 g/mol, or 500,000 g/mol. When the molecular weight is not too high, the second (e.g. polyvinyl acetate) polymer can aid in reducing the melt processing temperature and thereby reduce degradation of the PLA polymer.

The second polymer is preferably a polyvinyl acetate polymer. The polyvinyl acetate polymer is typically a homopolymer. However, the polymer may comprise relatively low concentrations of repeat units derived from other comonomers, provided that the Tg of the polyvinyl acetate polymer is within the ranges previously described. Other comonomers include for example acrylic monomers such as acrylic acid and methyl acrylate; vinyl monomers such as vinyl chloride and vinyl pyrollidone; and $C_2$-$C_8$ alkylene monomers, such as ethylene. The total concentration of repeats derived from other comonomers of the polyvinyl acetate polymer is typically no greater than 10, 9, 8, 7, 6, or 5 wt.-%. In some embodiments, the concentration of repeats derived from other comonomers of the polyvinyl acetate polymer is typically no greater than 4, 3, 2, 1 or 0.5 wt.-%. The polyvinyl acetate polymer typically has a low level of hydrolysis. The polymerized units of the polyvinyl acetate polymer that are hydrolyzed to units of vinyl alcohol is generally no greater than 10, 9, 8, 7, 6, 5, 4, 3, 2, 1 or 0.5 mol % of the polyvinyl acetate polymer.

Polyvinyl acetate polymers are commercially available from various suppliers including Wacker, Chemie AG, Muenchen, Germany, under the trade designation VINNAPAS™ and from Americas Corporation, West Chicago, Ill., under the trade designation VINAVIL™. Prior to combining with the PLA, such polyvinyl acetate polymers are often in a (e.g. white) solid powder or colorless bead form. In some embodiments, the polyvinyl acetate polymer (e.g. powder, prior to combining with the PLA polymer) is not water redispersible.

A single second (e.g. polyvinyl acetate) polymer may be utilized or a combination of two or more second (e.g. polyvinyl acetate) polymers may be used.

The total amount of second (e.g. polyvinyl acetate) polymer present in the oriented film is at least about 1, 2, 3, 4, 5 wt.-% and typically no greater than about 50, 45, or 40 wt.-% based on the total weight of the PLA polymer, second (e.g. polyvinyl acetate) polymer, and plasticizer. In some embodiments, the total amount of second (e.g. polyvinyl acetate) polymer present in the oriented film is least 6, 7, 8, 9, or 10 wt.-%. In some embodiments, the concentration of second (e.g. polyvinyl acetate) polymer is no greater than 35, 30, 25 or 20 wt.-%.

In some embodiments, the oriented film does not exhibit plasticizer migration when aged at 80° C. for 24 hours (according to the test methods described in PCT/US2015/065557). This property is attributable to the inclusion of the second (e.g. polyvinyl acetate) polymer.

The oriented film composition typically further comprises a plasticizer. The total amount of plasticizer in the oriented film is typically at least 1, 2, 3, or 4 wt.-% based on total weight of PLA polymer, second (e.g. polyvinyl acetate) polymer, and plasticizer. In some embodiments, the plasticizer concentration is no greater than 20, 19, 18, 17, 16, or 15 wt.-% of the film composition.

Various plasticizers that are capable of plasticizing PLA have been described in the art. The plasticizers are generally a liquid at 25° C. and typically have a molecular weight (Mw in the case of low molecular weight polymeric plasticizers) ranging from about 200 g/mol to 10,000 g/mol. In some embodiments, the molecular weight of the plasticizer is no greater than 5,000 g/mol. In other embodiments, the molecular weight of the plasticizer is no greater than 4,000, 3,000, 2,000 or 1,000 g/mol. Various combinations of plasticizers may be utilized.

The plasticizer preferably comprises one or more alkyl or aliphatic esters or ether groups. Multi-functional esters and/or ethers are typically preferred. Although alkyl phthalates, such as dibutyl phthalate, comprise aliphatic ester groups, in many preferred embodiments, the plasticizer is not a phthalate plasticizer and may also lack other aromatic groups. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Such plasticizers generally lack aromatic groups and halogen atoms and are anticipated to be biodegradable.

Such plasticizers commonly further comprise linear or branched alkyl terminal groups having a carbon chain length of $C_2$ to $C_{10}$.

In one embodiment, the plasticizer is a bio-based, citrate-based plasticizer represented by the following Formula (I):

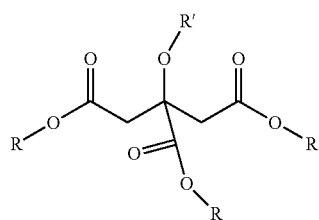

wherein

R are independently alkyl groups that may be the same or different; and

R' is an H or an ($C_1$ to $C_{10}$) acyl group.

R are typically independently linear or branched alkyl groups having a carbon chain length of $C_1$ to $C_{10}$. In some embodiments, R is a $C_2$ to $C_8$ or $C_2$ to $C_4$ linear alkyl group. In some embodiments, R' is acetyl. In other embodiments, at least one R is a branched alkyl group having a carbon chain length of $C_5$ or greater. In some embodiments, the branched alkyl group has a carbon chain length no greater than 8.

Representative citrate-based plasticizer includes for example triethyl citrate, acetyl triethyl citrate, tributyl citrate, acetyl tributyl citrate, trihexyl citrate, acetyl trihexyl citrate, trioctyl citrate, acetyl trioctyl citrate, butyryl trihexyl citrate, acetyl tris-3-methylbutyl citrate, acetyl tris-2-methylbutyl citrate, acetyl tris-2-ethylhexyl citrate, and acetyl tris-2-octyl citrate. One representative citrate-based plasticizer is acetyl tri-n-butyl citrate, available under the trade designation CITROFLEX A-4 PLASTICIZER™ from Vertellus Specialties, Incorporated, Indianapolis, Ind.

In another embodiment, the plasticizer comprises a polyethylene glycol backbone and ester alkyl terminal groups. The molecular weight of the polyethylene glycol segment is typically at least 100, 150 or 200 g/mole and no greater than 1,000 g/mole. In some embodiments, the polyethylene glycol segment has a molecular weight no greater than 900, 800, 700, or 600 g/mole. Examples include polyethylene glycol (400) di-ethylhexonate available from Hallstar, Chicago, Ill., under the trade designation "TegMeR™ 809" and tetraethylene glycol di-ethylhexonate available from Hallstar, Chicago, Ill., under the trade designation "TegMeR™ 804".

In another embodiment, the plasticizer may be characterized as a polymeric adipate (i.e. a polyester derived from adipic acid) such as commercially available from Eastman, Kingsport, Tenn., as Admex™ 6995.

In another embodiment, the plasticizer is a substituted or unsubstituted aliphatic polyester, such as described in U.S. Pat. No. 8,158,731; incorporated herein by reference.

In some embodiments, the aliphatic polyester plasticizer comprises repeating units derivable from succinic acid, glutaric acid, adipic acid, and/or sebacic acid. In some embodiments, the polyesters of the polymer blends disclosed herein comprise repeating units derivable from 1,3-propanediol and/or 1,2-propanediol. In some embodiments, the polyesters of the polymer blends disclosed herein comprise one or two terminator units derivable from 1-octanol, 1-decanol, and/or mixtures thereof. In some embodiments, the polyesters of the polymer blends disclosed herein comprise repeating units derivable from succinic acid, glutaric acid, adipic acid, and/or sebacic acid; repeating units derivable from 1,3-propanediol and/or 1,2-propanediol; and one or two terminator units derivable from 1-octanol, 1-decanol, and/or mixtures thereof.

In some embodiments, the aliphatic polyester plasticizer has the following formula:

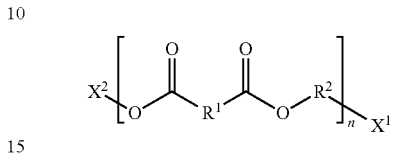

wherein n is 1 to 1000; $R^1$ is selected from the group consisting of a covalent bond and a substituted or unsubstituted aliphatic hydrocarbon group having 1 to 18 carbon atoms; $R^2$ is a substituted or unsubstituted aliphatic hydrocarbon group having 1 to 20 carbon atoms; $X^1$ is selected from the group consisting of —OH, —$O_2$C—$R^1$—$CO_2$H, and —$O_2$C—$R^1$—$CO_2R^3$; $X^2$ is selected from the group consisting of —H, —$R^2$—OH, and $R^3$; and $R^3$ is a substituted or unsubstituted aliphatic hydrocarbon group having 1 to 20 carbon atoms. In some embodiments, the polyester has the above formula with the proviso that if $X^1$ is —OH or —$O_2$C—$R^1$—$CO_2$H, then $X^2$ is $R^3$.

The number of repeat units n is selected such that the aliphatic polyester plasticizer has the previously described molecular weight.

In some embodiments, $R^1$, $R^2$, and/or $R^3$ are alkyl groups. $R^1$ alkyl groups can have, for example, from 1 to 18 carbon atoms, from 1 to 10 carbon atoms, from 1 to 8 carbon atoms, from 2 to 7 carbon atoms, from 2 to 6 carbon atoms, from 2 to 5 carbon atoms, from 2 to 4 carbon atoms, and/or 3 carbon atoms. $R^1$, for example, can be selected from the group consisting of —$(CH_2)_2$—, —$(CH_2)_3$—, —$(CH_2)_4$—, and —$(CH_2)_8$—. $R^2$ alkyl groups can have, for example, from 1 to 20 carbon atoms, from 1 to 10 carbon atoms, from 1 to 8 carbon atoms, from 2 to 7 carbon atoms, from 2 to 6 carbon atoms, from 2 to 5 carbon atoms, from 2 to 4 carbon atoms, and/or 3 carbon atoms. $R^2$, for example, can be selected from the group consisting of —$(CH_2)_3$—, —$CH_2CH(CH_3)$—, and —$CH(CH_3)CH_2$—. $R^3$ alkyl groups can have, for example, from 1 to 20 carbon atoms, from 1 to 18 carbon atoms, from 2 to 16 carbon atoms, from 3 to 14 carbon atoms, from 4 to 12 carbon atoms, from 6 to 12 carbon atoms, from 8 to 12 carbon atoms, and/or from 8 to 10 carbon atoms. $R^3$, for example, also can be a mixture comprising —$(CH_2)_7CH_3$ and —$(CH_2)_9CH_3$.

In some embodiments, $R^1$ is an alkyl group having from 1 to 10 carbons, $R^2$ is an alkyl group having from 1 to 10 carbons, and $R^3$ is an alkyl group having from 1 to 20 carbons. In other embodiments, $R^1$ is an alkyl group having from 2 to 6 carbons, $R^2$ is an alkyl group having from 2 to 6 carbons, and $R^3$ is an alkyl group having from 8 to 12 carbons. In still other embodiments, $R^1$ is an alkyl group having from 2 to 4 carbons, $R^2$ is an alkyl group having from 2 to 3 carbons, and $R^3$ is an alkyl group having from 8 to 10 carbons. In yet other embodiments, $R^1$ is selected from the group consisting of —$(CH_2)_2$—, —$(CH_2)_3$—, —$(CH_2)_4$—, and —$(CH_2)_8$—, $R^2$ is selected from the group consisting of —$(CH_2)_3$—, —$CH_2CH(CH_3)$—, and —$CH(CH_3)CH_2$—, and $R^3$ is a mixture comprising —$(CH_2)_7CH_3$ and —$(CH_2)_9CH_3$.

The aliphatic polyester plasticizer can have an acid value of about zero to about 20, for example, about 0.001 to about 10, about 0.01 to about 7, about 0.05 to about 5, about 0.1 to about 3, about 0.2 about 2, about 0.3 to about 1, about 2 to about 20, about 5 to about 20, about 8 to about 20, about 10 to about 20, and/or about 12 to about 18. The polyesters also can have an acid value greater than about 20. The acid value of the polyesters can be determined by known methods for measuring the number of milligrams of potassium hydroxide necessary to neutralize the free acids in one gram of polyester sample.

Plasticizer with a low acid value can be preferred for shelf-life stability and/or durability of the film. In some embodiments, the acid value of the plasticizer is preferably no greater than 10, 9, 8, 7, 6, 5, 4, 3, 2 or 1.

The aliphatic polyester plasticizer can have a hydroxyl value of about zero to about 110, for example, about 1 to about 40, about 10 to about 30, about 15 to about 25, about 30 to about 110, about 40 to about 110, about 50 to about 110, and/or about 60 to about 90. The polyesters also can have a hydroxyl value greater than about 110. The hydroxyl value of the polyesters can be determined by known methods for measuring hydroxyl groups, such as the methods described by ASTM Test Method D 4274.

One representative aliphatic polyester plasticizer is available from Hallstar, Chicago, Ill., as the trade designation "HALLGREEN R-8010".

In some embodiments, the wt.-% percent of hydroxyl groups relative to the total weight of the plasticizer compound is no greater than 10, 9, 8, 7, 6, 5, 4, 3, 2, 1 wt.-%. In some embodiments the plasticizer compound contains no hydroxyl groups. Thus, in this embodiment, the plasticizer is not glycerol or water.

When low haze is not a consideration, to facilitate the rate of crystallization, a nucleating agent may optionally be present in the PLA film composition. Suitable nucleating agent(s) include for example inorganic minerals, organic compounds, salts of organic acids and imides, finely divided crystalline polymers with a melting point above the processing temperature of PLA, and combinations of two or more of the foregoing. Suitable nucleating agents typically have an average particle size of at least 25 nanometers, or at least 0.1 micron. Combinations of two or more different nucleating agents may also be used.

Examples of useful nucleating agents include, for example, talc (hydrated magnesium silicate —$H_2Mg_3(SiO_3)_4$ or $Mg_3Si_4O_{10}(OH)_2$), silica ($SiO_2$), titania ($TiO_2$), alumina ($Al_2O_3$), zinc oxide, sodium salt of saccharin, calcium silicate, sodium benzoate, calcium titanate, aromatic sulfonate derivative, boron nitride, copper phthalocyanine, phthalocyanine, sodium salt of saccharin, isotactic polypropylene, polybutylene terephthalate, and the like.

When an organic nucleating agent is present, the nucleating agent is typically at a concentration of at least 0.01, 0.02, 0.03, 0.04, 0.05, 0.1, 0.15 or 0.2 wt.-% ranging up to about 1, 2, 3, 4 or 5 wt.-% based on the total weight of the film composition. When the nucleating agent is an inorganic oxide filler such as silica, alumina, zinc oxide, and talc, the concentration can be higher.

In one embodiment, the nucleating agent may be characterized as a salt of a phosphorous-containing aromatic organic acid such as zinc phenylphosphonate, magnesium phenylphosphonate, disodium 4-tert-butylphenyl phosponate, and sodium diphenylphosphinates.

One favored nucleating agent is zinc phenylphosphonate having the following chemical formula:

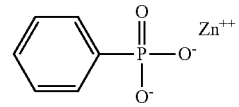

available from Nissan Chemical Industries, Ltd., under the trade designation "Ecopromote™".

In some embodiments, inorganic fillers may be used to prevent blocking or sticking of layers or rolls of the film during storage and transport. Inorganic fillers include clays and minerals, either surface modified or not. Examples include talc, diatomaceous earth, silica, mica, kaolin, titanium dioxide, perlite, and wollastonite.

When low haze is desired, the oriented film is typically substantially free of nucleating agent, as well as other additives that increase haze, such as those having a particle size of greater than 100 or 200 nanometers. In this embodiment, the concentration of nucleating agent is less than 0.01, 0.005, 0.001 wt.-%, or 0. Further, the concentration of other additive(s) that increase haze is also typically less than 0.01, 0.005, 0.001 wt.-%.

Organic biomaterial fillers include a variety of forest and agricultural products, either with or without modification. Examples include cellulose, wheat, starch, modified starch, chitin, chitosan, keratin, cellulosic materials derived from agricultural products, gluten, flour, and guar gum. The term "flour" concerns generally a film composition having protein-containing and starch-containing fractions originating from one and the same vegetable source, wherein the protein-containing fraction and the starch-containing fraction have not been separated from one another. Typical proteins present in the flours are globulins, albumins, glutenins, secalins, prolamins, and glutelins. In typical embodiments, the film composition comprises little or no organic biomaterial fillers such a flour. Thus, the concentration of organic biomaterial filler (e.g. flour) is typically less than 10, 9, 8, 7, 6, 5, 4, 3, 2, or 1 wt.-% of the total film composition.

In order to reduce haze, reducing the mismatch of refractive index between an immiscible filler and the polymer blend is an effective strategy. In an oriented film, the thickness index is typically the lowest principal value of the anisotropic refractive indices. In some embodiments it can be advantageous to form an oriented PLA-based polymer blend film with a thickness refractive index (i.e. refractive index in the z-direction) greater than 1.455 at 589 nm.

The oriented film may optionally contain one or more conventional additives. Additives include, for example, antioxidants, stabilizers, ultraviolet absorbers, lubricants, processing aids (e.g. slip agents, antiblocking agents), antistatic agents, colorants, impact resistance aids, fillers (e.g. diatomaceous earth), matting agents, flame retardants (e.g. zinc borate), pigments (e.g. titanium dioxide), and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

In some embodiments, the oriented film comprises an anti-blocking or "slip" agent such as a fatty acid derivative. One suitable anti-blocking agent is a mixture of PLA polymer, 5-10 wt.-% of a fatty acid derivative and 20 to 40 wt.-% of silica, such as available under the trade designation SUKANO DC S511™ from Sukano Polymers Corporation, Duncan, S.C. However, the inclusion of slip agent particulates can introduce a small amount of haze and can decrease the optical transmission of the film. It may be advantageous to cast a multilayer film with only one outer layer comprising the slip material to reduce haze in the film construction.

When present, the amount of additive can be at least 0.1, 0.2, 0.3, 0.4, or 0.5 wt.-%. In some embodiments, the amount of additive is no greater than 5, 4, 3, 2, or 1 wt.-%. In other (e.g. opaque film) embodiments, the amount of (e.g. fillers or pigment) additive is no greater than 25, 20, 15, 10 or 5 wt.-% of the total film composition. In other embodiments, the concentration of additive can range up to 40 wt.-% or more of the total film composition.

The oriented film may be a monolithic film or a film layer of a multilayer film.

When the oriented film is a monolithic film, the thickness of the film is typically at least 10, 15, 20, or 25 microns (1 mil) to 250 microns (10 mils) or even 500 microns (20 mils) thickness. In some embodiments, the thickness of the film is no greater than 500, 250, 200, 150, 100, 50 or 25 microns. The film may be in the form of individual sheets or a (e.g. continuous) roll-good.

When the oriented film is a film layer of a multilayer film, the multilayer film typically has the thickness just described. However, the thickness of the (e.g. PLA-based) film layer may be less than 10 microns. The multilayer films may be co-extruded or an otherwise stacked construction, such as adhesively laminated together. The PLA-based film composition can be co-extruded with additional layers of similar or different materials. In general, the multilayer, comprising at least one oriented PLA-based layer of the present invention, may comprise 2, 3, 5, 10, 50 or more layers.

In one embodiment, the film layer comprising the PLA-based film composition described herein is an exterior layer or in other words a skin layer. A second (e.g. core) film layer is disposed upon the skin layer. The second film layer typically has a different composition than the skin layer. The second (e.g. core) film layer may comprise the same components as the skin layer; yet at different concentrations. The second (e.g. core) film layer may comprise the different components as the skin layer. For example, in one embodiment, the core layer may comprise an amorphous PLA polymer. It is contemplated to have further coextruded layers as well, such as other interlayers between the core and outermost skin layers on either or both sides of the core layer.

In one embodiment, the oriented PLA film comprises a coextruded multilayer structure such as a 3-layer film of skin layer/core layer/skin layer wherein the two outer coextruded skin layers are the same composition and the core layer is a different composition. In this embodiment, the skin layers or the core layer may comprise the oriented PLA film described herein.

In one embodiment of the multilayer structure, the skin layer may comprise or consist of PLA in the absence of polyvinyl acetate polymer and/or plasticizer.
In another embodiment of the multilayer structure, the skin layer may contain other biodegradable polymers, such as polyhydroxybutyrate-valerate, polycaprolactone, polybutylene-adipate-co-terephthalate, polybutylene-succinate, polybutylene-succinate-adipate, or mixtures thereof.

The general processes for making an oriented PLA-based films are described in the art, e.g. by U.S. Pat. No. 5,443,780 and No. 6136905, as well as by the review article by Lim et al., *Process Technologies for Polylactic acid*), Progress in Polym. Sci., 33 (2008), pp 820-852. The method comprises providing a monolithic film or film layer comprising a (e.g. miscible) mixture of a semicrystalline polylactic acid polymer, and a second (e.g. polyvinyl acetate polymer) polymer, and plasticizer; as described herein and stretching the film in at least one direction such that the film is oriented. The miscibility of the mixture is evidenced by the fact that the composition, in the form of a cast unoriented film, exhibits a single Tg as measured according to the test method described in the examples. The composition, in the form of a cast unoriented film, typically exhibits a single midpoint (half-height) Tg of at least 40, 41 or 42° C. ranging up to 47, 48, 49, 50° C. or greater. In some embodiments, the (half-height) midpoint Tg ranges up to 55, 60, or 65° C.

PLA is a moisture sensitive resin and should be dried before or during extrusion to prevent degradation. The drying can be done by any means known in the art. One well-known means employs ovens or a more sophisticated heated vacuum and/or desiccant hopper-dryers to dry resin prior to its being fed to an extruder. Typically the polymer is dried to a water content of less than 250, 200, 150, 100, or 50 ppm. Drying of the PLA typically takes place in the temperature range from 70-100° C. for semi-crystalline grades of PLA polymer. Amorphous grades are typically dried below the Tg (typically about 60° C.) to prevent the polymer pellets from sticking together prior to melt blending or extrusion. Another means employs a vacuum-vented twin-screw extruder to remove moisture from the resin while it is being extruded. Drying time and temperature should be limited to prevent thermal degradation or sticking during hopper-dryer or oven drying. In addition, resins coextruded with moisture sensitive resins are also dried to prevent damage to the moisture sensitive coextruded (e.g. PLA) resin. Again, this can be accomplished during extrusion which can be particularly advantageous when combining low glass transition temperature (Tg) polymers such as polyvinyl acetate and liquid plasticizers.

In some instances following mixing, the PLA-based film can be formed by methods that afford a non-oriented film. In some embodiments, the PLA-based film composition is transferred to a press and then compressed and solidified to form individual sheets of PLA film. In other embodiments, the PLA-based film composition may be extruded through a die onto a casting roll maintained at a suitable cooling temperature to form a continuous length of PLA-based film.

When the oriented PLA-based film is formed via extrusion, conditions are chosen to adequately feed, melt, mix and pump the polymer resin feed streams in a continuous and stable manner. In some embodiments, it may be advantageous to pre-compound the materials in a separate process (e.g. using a brabender, mixer, kneader or extruder). The compounded and re-pelletized materials are then extruded in a second process to form the film. In either case, when adding low glass transition temperature (Tg) materials like polyvinyl acetate, active feed throat cooling is often utilized to prevent clogging of the feed throat. Proper screw design as known in the art can ensure mixing of the various components. Liquid materials can be preheated, e.g. to over 100° C., and introduced through an active feed port using a pumping system often equipped with an independent mass flow meter. Such liquid materials may be introduced prior to a final mixing zone and also prior to a vacuum drying zone. The extrusion temperature is selected such that it is greater than the melting temperature (Tm) of the PLA-based film composition described herein. The extrusion temperature is typically at least 20, 30, 40, or 50° C. greater than the melting temperature. When the extrusion temperature is too low, extrusion stability is difficult to obtain. When the extrusion temperature it is too high, the composition can be subject to thermal degradation. Final melt stream temperatures are thus chosen within a range which avoids freezing, crystallization or unduly high pressure drops at the low end of the temperature range and which avoids degradation at the high end of the temperature range. For example, polylactic acid resin is dried at 70° C. for 8 hours and then fed with polyvinyl acetate into an extruder throat actively cooled to 90° C. or less then into an extruder with increasing zone temperatures, or melt temperatures, up to a final setting preferably between 175° C. and 230° C. and more preferably between 185° C. and 205° C.

Following the flow from the extruder, the melt streams are then filtered to remove undesirable particles and gels. Primary and secondary filters known in the art of polyester film manufacture may be used, with mesh sizes in the 1-30 micrometer range. While the prior art indicates the importance of such filtration to film cleanliness and surface properties, its significance in the present invention extends to layer uniformity as well. In the case of a multilayer co-extrusion, each melt stream is conveyed, e.g. through a neck tube, into a gear pump used to regulate the continuous and uniform rate of polymer flow. A static mixing unit may be placed at the end of the neck tube carrying the melt from the gear pump into the multilayer feedblock, in order to ensure uniform melt stream temperature. The entire melt stream is heated as uniformly as possible to ensure both uniform flow and minimal degradation during processing.

The film is cast from the die either directly onto a chill wheel or blown and then quenched. The die orifice can have circular or linear slits. The die temperature is typically about the same as the range of the final extrusion and melt train temperatures.

When the film is cast directly onto a roll, it may be cast between nips or cast onto a single quench wheel as assisted by electrostatic pinning, the details of which are well-known in the art of polyester film manufacture. Care should be exercised in setting the parameters of the electrostatic pinning apparatus. Periodic cast web thickness variations along the extrusion direction of the film, frequently referred to as "pinning chatter," are minimized. Adjustments to the current, voltage, pinning wire thickness, and pinning wire location with respect to the die and the casting chill roll are all known to have an effect and are selected accordingly by one skilled in the art. When the film is cast onto a quench roll with electrostatic pinning, the film may be cast to a uniform thickness across the web or a deliberate profiling of the web thickness may be induced using die lip controls. Such profiles may improve uniformity by the end of the film process. In other embodiments, a uniform cast thickness provides best uniformity at the end of the film process. Controlling vibrations in the process equipment is also important to reduce "chatter" in the cast film.

One major surface of the film can have a different surface texture and/or different degree of crystallinity and/or other properties relative to the opposing major surface. This difference can be due to wheel contact on one side and merely air contact on the other. This can be desirable in some applications and undesirable in others. When minimization of such differences is desired, a nip roll can be used in combination with the casting roll to enhance quenching or to provide smoothing onto what would otherwise be the air side of the cast film. To minimize surface haze, smooth finishes are desired for both the casting wheel and the optional nip roll.

The casting roll can have a structured surface, such as a matte surface. Further, the PLA-based film can also be embossed to impart a structured surface prior to or after orientation.

The casting wheel temperature also impacts the level of crystallization that forms during quenching on the casting roll. To reduce haze, it is usually desirable to minimize this quenching temperature without causing moisture condensation on the wheel. Thus casting wheel temperatures, depending on ambient conditions, between 15° C. and 30° C. are typically preferred.

The non-oriented films may be uniaxially or biaxially stretched, e.g. using batch or continuous stretching processes according to known methods. (See e.g., L. T. Lim, R. Auras, and M. Rubino, "Processing Technologies for Poly (lactic acid)," Progress in Polymer Science 33[2008]820-852). The two principal in-plane directions for the application of stretching are typically called the machine direction (MD) and transverse direction (TD) for a continuously fed stretching process. The machine direction is the direction of film travel from extrusion to winding. In a batch process, these terms may be applied by orienting the actual cast film into the device for stretching in the corresponding manner to these references.

A continuous process for longitudinal stretching can be done by pull rolls, e.g. in a so-called length orienter. The film is heated, ultimately stretched by the increasing ratio of angular velocity of these rolls and then quenched. Transverse stretching can be done in a tenter oven which grips the film at its edges and then increases the distances between these grippers in TD as the film continues to proceed along MD. If desired, the film can be bi-axially oriented simultaneously using a variety of known "simo-biax" tenters.

Temperature has a major effect on the characteristic average longest relaxation time of the material, and is thus a major factor in determining whether a given material experiences a weak (non-orienting) or strong (orienting) flow. The dependence of the characteristic average longest relaxation time on temperature can be quantified by the well-known WLF equation [See, J. D. Ferry, Viscoelastic Properties of Polymers, John Wiley & Sons, New York, 1970]. This equation contains three parameters, $c_1$, $c_2$ and $T_0$. Often, $T_0$ is associated with the glass transition temperature, (Tg). Using the approximate "universal" values for $c_1$ and $c_2$, applicable as a first estimate for many polymers, the WLF equation shows the large dependence on relaxation times with temperature. For example, using a relaxation time at 5° C. higher than the glass transition temperature (Tg) as a value for comparison, the relaxation times at 10° C., 15° C. and 20° C. higher than Tg are approximately 20, 250 and 2000 times shorter, respectively. Greater accuracy for WLF parameters can be obtained by using empirical curve fitting techniques. Thus, to a first approximation, the single most important parameter for temperature effects on the characteristic time is Tg. The larger the temperature difference between the web temperature and Tg, the smaller the characteristic time and thus the weaker the draw flow. The glass transition temperature (Tg) of the PLA-blend may be measured using DSC as subsequently described. Thus, the stretching temperature is typically at least 1, 5, 10, 20, 30, 40, or 50° C. greater than the (e.g. midpoint) glass transition temperature (Tg) of the PLA-based film composition described herein. When the stretching temperature is too low, stretching may be difficult, whereas when the stretching temperature is too high, the uniformity in thickness and mechanical strength may be compromised. Considering the well-known time/temperature principal for polymer viscoelasticity, the draw temperature is also adjusted according to the draw rate of the process. Typical draw rates can range between 10 and 10,000%/sec. At high temperatures and/or low strain rates, polymers tend to flow when drawn like a viscous liquid with little or no molecular orientation. At low temperatures and/or high strain rates, polymers tend to draw elastically like solids with concomitant molecular orientation. In order to achieve molecular orientation, the film must be drawn fast enough with respect to the given temperature. It will be appreciated that the response of a given PLA blend composition can be altered by controlling the drawing temperature, rate and draw ratio of the process. A process which occurs in a short enough time and/or at a cold enough temperature to induce substantial molecular orientation is an orienting or strong draw process. A process which occurs over a long enough period and/or at hot enough temperatures such that little or no molecular orientation occurs is a non-orienting or weak process. To achieve orientation via a strong flow, stretching temperatures are generally chosen as no more than 40° C. and more preferably no more than 30° C. above the $T_g$ prior to the onset of strain-induced crystallization. Further, it is reiterated that this discussion is most pertinent to the draw process prior to crystallization, especially strain induced crystallization. After crystallization occurs, the presence of crystals can further retard relaxation times and convert otherwise weak flows to strong flows. Thus, temperatures in the tenter sequentially following a length orientation are typically higher than those in the length orienter, while initial temperatures in a uniaxial tenter process or simultaneously biaxial process are intermediate between these.

The selection of both the PLA and polyvinyl acetate resins as well as the plasticizer affect the resulting relaxation times of the polymer blend. Besides the resulting glass transition temperature (Tg), the weight average molecular weight is a particularly significant factor. For a given composition, the characteristic time tends to increase as a function of molecular weight (typically as the 3 to 3.5 power of molecular weight) for polymers whose molecular weight is well above the entanglement threshold. Ingeo™ grades 6062D, 4032D and 4060 available from NatureWorks, LLC, Minnetonka, Minn., are examples of such entangled PLA polymers. Likewise Vinnapas™ grades B60, UHWFS2 and UHWFS25 available from Wacker are examples of entangled polyvinyl acetate polymers. For unentangled polymers, the characteristic time tends to increase as a weaker function of molecular weight. Low molecular weight plasticizers tend to not only shift the glass transition temperature (Tg) but also weaken the entanglement density and reduce the characteristic longest relaxation times. Addition of such low molecular weight materials thus can also be used to adjust the rheological properties as long as detrimental effects such as brittleness and phase separation are not manifest.

Another parameter of importance is the extent of the draw process, as characterized by the draw ratio. As used herein, draw ration refers to the ratio of a final dimension to initial dimension in a given direction. Strong draw processes typically need enough duration (that is, a high enough draw ratio) to accomplish sufficient orientation, e.g. to exceed the threshold for strain-induced crystallization, thereby achieving high birefringence in the PLA material. Thus, the strain rate history profile, which is the collection of the instantaneous strain rates over the course of the drawing sequence, is considered for determining the draw process. The accumulation of the instantaneous strain rates over the entire draw process determines the final draw ratio. The temperature and strain rate draw profile history help determine the draw ratio at which the polymer experiences the onset of strain-induced crystallization, given the characteristic time and supercooling of that polymer. For PLA, experimental evidence suggests this onset draw ratio has a limit between 1.5 and 2 at high rates of strain. At lower rates of strain, for films with negligible crystallization during casting, the onset draw ratio for PLA can be over 3. The final level of orientation often correlates with the ratio of the final draw ratio to the onset draw ratio.

When the cast film comprises nucleating agents, crystallization with the resulting suppression of molecular relaxation may be present before stretching. Any stretching may then present a strong flow situation. If the crystallization is not too high, an oriented film may still be formed in some cases by drawing the film near its melting point in analogy to polypropylene processing.

The machine and/or transverse stretching may be performed in a single stage or plural stages. In some embodiments, PLA-based film is uniaxially or biaxially drawn at a draw ratio of at least 1.5, 2.0, 2.5, 3.0, 3.5 or 4 times in either the machine direction (MD), the transverse direction (TD) of the film or both. In some cases, the transverse direction drawn is to a larger extent, but typically no greater than 8, 7, 6 or 5 times. These higher draw ratios are particularly useful for making a hand tearable film along the TD direction.

In some embodiments, the PLA-based film is uniaxially stretched in the transverse direction. In this embodiment, the PLA-based film may be drawn a minor amount in machine direction. For example, the machine direction (MD) draw ratio of the film is typically less than 2.0, 1.5, 1.4, or 1.3.

In other embodiments, the PLA-based film is biaxially stretched in both the transverse and machine direction. In this embodiment, the PLA-based film is drawn at a draw ratio of at least 2.0, 2.5, 3.0, 3.5 or 4 times in both the transverse direction (TD) and machine direction (MD) of the film.

Sometimes it is desirable to draw the film in such a way that one or more properties, measured on the finished films, have identical values in the machine and transverse directions. Such films are often referred to as "balanced" films. Machine- and transverse-direction balance can be achieved by selecting process conditions using techniques well known in the art of biaxially oriented film making. Typically, process parameters explored include machine-direction orientation preheat temperature, stretch temperature, and draw ratio, tenter preheat temperature, tenter stretch temperature, and tenter draw ratio, and, sometimes, parameters related to the post-stretching zones of the tenter. Other parameters may also be significant. Typically, designed experiments are performed and analyzed to arrive at appropriate combinations of conditions. Those skilled in the art will appreciate the need to perform such an assessment individually for each film construction and each film line on which it is to be made.

The films may be heat set after stretching at temperatures at or above the stretching temperature and below the crystalline melting point of the film. After stretching, the film may be strain-relaxed before, during and/or after heat setting. Such strain relaxation is a physical reduction in the draw ratio, e.g. by the reduction in spacing of the gripping elements holding the film in the stretching process. An example of this is a so-called "toe-in" of the tenter rails. Such a strain relaxation may be generically referred to a "toe-in" in this description, for either a batch or continuous operation. Toe-in may be performed in one direction, e.g. TD, or in both the MD and TD. A simultaneous biaxial tenter can perform such two-directional tow-ins in a continuous film stretching process. The film may be furthermore wound into a roll of film, optionally slit to a desired width.

Heat setting can also be useful in improving other properties, such as dimensional stability (with regard to both temperature and humidity) and interlayer adhesion. Finally, tension conditions at quenching, prior to winding, can also affect physical properties, such as shrinkage. Reduced winding tension and reduced cross web tension via a toe in (reduction in transverse draw ratio) can also reduce shrinkage. Post-winding heat treatment of film rolls and re-winding can also be used to improve dimensional stability and roll formation. Thus, the various properties of dimensional stability (such as shrinkage at elevated temperature and reversible coefficient of thermal expansion) are affected by a variety of process conditions in addition to the selection of PLA and polyvinyl acetate polymer. Such parameters include, but are not limited to, heat set temperature, heat set duration, transverse direction dimensional relaxation ("toe-in") both in extent and placement before, during and after heat set e.g. during web cooling, web tension, and heat "soaking" (or annealing) after winding into rolls. Again, designed experiments can be performed by one skilled in the art to determine optimum conditions for a given set of dimensional stability requirements, for a given film composition, and for a given film line.

Finally, it should be noted that the temperature of the film during pre-heating, stretching and heat setting in the various process zones can be controlled by roll heating (e.g. in a length orienter) and oven zoning (e.g. in a tenter). Moreover, both crossweb and downweb heating can be further controlled at any point in the process using infrared heaters. One skilled in the art will appreciate the many options for zoning and controlling the addition of infrared heat. Further, the possibilities for combining infrared edge heating with changes in the cast web's cross-web thickness profile will also be apparent.

Multilayer co-extrusion of PLA-based film compositions include the general considerations for generating precise, uniform and stable layers as known in the art. In general, co-extrusion resulting in uniform, well-formed layers requires multilayer flow stability. This is achieved by matching or balancing the rheological properties, such as viscosity and elasticity, between the materials of the various layers to within a certain tolerance. The level of required tolerance or balance also depends on the materials selected for the internal skin layers (e.g. protective boundary layers "PBL") and final skin layers that reside in the high shear zone near the walls of the various flow channels, e.g. in the feedblock, multiplier and/or die. For flow stability of low elasticity, the typical ratio between high and low viscosity materials is no more than 4:1, preferably no more than 2:1, and most preferably no more than 1.5:1 for the process conditions typical of feedblocks, multipliers, and dies. Using the lower viscosity materials in the PBLs and skin layers usually enhances flow stability.

It is often preferable for all polymers entering the multilayer feedblock to be at the same or very similar melt temperatures. This may require process compromise if two polymers, whose ideal melt processing temperatures do not match, are to be coextruded. One technique found to be useful in this regard is to start up the more temperature sensitive resins melt trains at their more conventional processing temperatures, and then to raise the melt train temperatures to the higher temperature desirable for the other co-extruded layers only at or just prior to material layer contact, e.g. into the feedblock or die. Temperature control is important in the feedblock and subsequent flow leading to casting at the die lip.

Shear rate is observed to affect viscosity and other rheological properties, such as elasticity. Flow stability sometimes appears to improve by matching the relative shape of the viscosity (or other rheological function) versus shear rate curves of the coextruded polymers. In other words, minimization of maximal mismatch between such curves may be an appropriate objective for flow stability. Thus, temperature differences at various stages in the flow can help to balance shear or other flow rate differences over the course of that flow. Thus, while temperature uniformity is often desired, in some cases, deliberate temperature gradients in the feedblock or temperature differences of up to about 40° C. in the feed streams can be used to narrow or widen crossweb layer thickness distributions. eed streams into the various outer (or "skin") layers and inner (or "core") layers can also be set at different temperatures than the feedblock average temperature. Often, the outer or skin layers may be set up to 40° C. higher than the feed stream temperature to reduce viscosity or elasticity in these outer layers, e.g. to reduce edge encapsulation of the core layers. Sometimes, the outer layer temperatures can be decreased up to about 40.degree. C. to improve the rheology matching between them and the rest of the flow stream. F or example, decreasing the temperature of a low viscosity skin may enhance viscosity matching and enhance flow stability. Other times, elastic effects need to be matched. It will also be evident to one skilled in the art that viscosity and other rheological matching for good co-extrusion can be achieved using various combinations thinning and thickening agents. Thinning agents include lower molecular weight (e.g. polyvinyl acetate) polymers and plasticizers while thickening agents may include fillers and so-called chain extender additives such as Joncryl™, available from BASF. Other chain extenders for polyester include but are not limited to: anhydride (such as maleic anhydride, phthalic anhydride and pyromellitic dianhydride), epoxide, and isocyanate functionalized molecules.

By selecting the materials and process conditions in consideration of the orienting/non-orienting response of the materials, a film can be constructed such that the materials of the various layers have draw compatibility; that is, the multilayer can be stretched resulting in a film with an oriented layer of the PLA-based composition described herein. Temperatures for drawing are generally chosen so that each layer is above its glass transition temperature (Tg). Using time/temperature principals well-known in the art, draw rates are likewise set. Draw ratios are also set to avoid voiding, cracks and breakage using the behavior of the monolithic films of each component layer as a guide. In this manner, the multilayer film can stretch without voiding, cracking and/or breaking. Moreover, the temperature and rate are chosen to result in a strong orienting flow for the PLA-based composition of the film layer. The draw conditions can also be chosen to take advantage of the different visco-elastic characteristics of the various layers.

In one set of multilayer constructions, the multilayer comprises layers of various PLA-based compositions of similar drawing properties, e.g. comprising different additives and compensating variations in the weight % composition between plasticizer, polyvinyl acetate content and PLA.

In another set of multilayer constructions, the multilayer comprises other materials with similar orientation temperatures and draw ratios.

In still another set of multilayer constructions, the PLA-blend layer material is oriented and birefringent and at least some of the other layers remain essentially unoriented. That is, the process is a strong draw process for the PLA-blend material and a weak draw process for these other materials.

In another consideration, adhesion between layers in a multilayer film is often adversely affected by drawing, with stretched films frequently being much more prone to exfoliation of layers than the cast webs from which they were made. Material selection, processing conditions including the ultimate level of draw ratio, and final thicknesses of the various layers need to be considered to optimize and balance interlayer adhesion with the other desired properties of the film.

The oriented film and film compositions can have various properties, as determined by the test methods set forth in the examples.

In general, the birefringence (i.e. the difference in refractive index between two or more principal directions of the dielectric tensor) of a polymer experiencing a strong flow deformation tends to increase with the draw ratio. Typically, the principal directions of the anisotropic index of refraction are two orthogonal in-plane directions and the thickness direction. In some cases, the two in-plane principal directions can be approximated by the two drawing directions MD and TD, e.g. in the center of the film or in the center of a roll cut from such a central portion. Process non-uniformities like so-called "bowback" and non-uniform temperature fields can cause rotation of these principal axes as a function of the crossweb position. (Uniform directionality of the optical axes is usually desirable for enhanced yield and performance. Processes that limit such bowing and rotation, such as tension control or isolation via mechanical or thermal methods, can be used.) Under such circumstances, the principal values are the highest and lowest orthogonal values measured. For simplicity of discussion, the MD and TD in-plane refractive indices are assumed in the description of the present invention to closely approximate those of the principal directions in-plane. In the general case of the present invention, the principal values along the principal directions are the operative values for calculation of birefringence.

For PLA-blends incorporated in the oriented films of the present invention, stretching tends to increase indices along directions of stretching and lower them along non-stretched directions. When oriented, these polymeric blends exhibit birefringence, i.e. as derived from an anisotropic set of principal refractive indices. Three birefringences can be derived from these three principal refractive indices: the in-plane birefringence between the two in-plane directions, the MD out-of-plane birefringence (defined as the difference between the MD and thickness indices) and the TD out-of-plane birefringence (defined as the difference between the TD and thickness indices). Note that the difference between the latter two birefringences results in the first. Because absolute levels of refractive index often vary between mixtures, birefringence often can be a more useful measure for comparisons. Because the thickness refractive index is typically the lowest after orientation, the out-of-plane birefringences are the most useful in characterizing the relative overall level of orientation. (In the general case, wherein the principal directions for the refractive indices are rotated away from MD and TD, the principal values, i.e. the maximum and minimum values in-plane, are used to calculate the out-of-plane birefringences and total birefringence.) The sum of the out-of-plane birefringences, herewith defined as the "total birefringence," is also a useful measure for the total level of orientation. An extremely highly oriented film of pure PLA made using a high molecular resin of low D-lactide content, such as Ingeo™ 4032 D, can achieve a total birefringence of at least 0.005, 0.010, 0.015, 0.020, 0.025, 0.030, 0.032 or more.

Both mechanical and optical properties often correlate with birefringence. Thus control of the birefringence often translates to a first approximation to control of the birefringence. (Since elastic moduli are a higher order tensor for anisotropic materials, such properties are also affected by additional considerations like the morphology of the developed semi-crystalline network.) Because of strain-induced crystallization, for a given draw process there may be a certain draw ratio at which this birefringence begins to increase more dramatically. After onset of crystallization, the slope may again change (e.g. drop) due to changes in the relative amount of continued nucleation and growth with further drawing. For PLA-based compositions of this present invention, a typical refractive index for the unoriented polymer blend is between 1.45 and 1.47 at 632.8 nm. Oriented films of the present invention typically exhibit at least one out-of-plane birefringence of at least 0.005, and more preferably at least 0.01, at 632.8 nm. Oriented films of the present invention also exhibit a high total birefringence. When the total birefringence is adjusted for the total PLA content in the film (i.e. the measured total birefringence is divided by the weight fraction of PLA in the blend to form an "effective" total birefringence), films of the present invention can achieve effective total birefringences approaching the pure PLA values. This is a surprising result given the expected impact of plasticizers on the crystallization dynamics on the PLA. Effective total birefringence for the films of the present invention are typically 0.015 or more. For biaxially oriented films, the effective total birefringence is preferably at least 0.020, more preferably at least 0.022 and still more preferably 0.025 or more.

When the film is uniaxially stretched, or biaxially stretched asymmetrically, and when the film is sufficiently thin, (e.g. a thickness between 15 and 75 microns) the film or a laminate comprising the film, may be hand-tearable along the direction of major stretching. In these cases, the film may exhibit neat tear initiation and reasonably straight tear propagation along this axis. In addition, the film may exhibit resistance to tear initiation in the perpendicular direction.

The stretching conditions affect the thermal shrinkage. When the film is uniaxially oriented, the shrinkage typically ranges from slightly greater than 3% to slightly greater than 4.5%. However, biaxially oriented PLA-based films as described herein can exhibit a 5 minute shrinkage at 120° C. of less than 3%. In some embodiments, the oriented PLA-based film exhibits a 5 minute shrinkage at 120° C. of less than 2.5 or 2%.

The molecular weight of the polyvinyl acetate polymer can also affect thermal shrinkage. In some embodiments, the polyvinyl acetate has a molecular weight greater than 30,000 g/mole; 40,000 g/mole, or 50,000 g/mole.

The oriented films described herein can be clear, having a low haze. Although not wishing to be limited by theory, the lower haze may relate to potentially higher crystalline uniformity and the existence of finer, more numerous crystal centers in the compositions with the higher molecular weight PVAc. Haze may be related to both surface features and bulk features. In some embodiments, the haze of the mixture of PLA-polymer, second polymer such as polyvinyl acetate, and plasticizer or the oriented film is less than 0.30, 0.35, 0.20, 0.15, 0.10% haze/micron film thickness. Many of the uniaxially oriented films of the present invention exhibit an haze of less than 0.15 or 0.10% haze/micron film thickness. Many of the biaxially oriented films of the present invention exhibit an overall haze of less than 0.050, 0.045, 0.040, 0.035, 0.030, or 0.025%/micron film thickness. In some embodiments, the haze of the mixture of PLA-polymer, second polymer such as polyvinyl acetate, and plasticizer or the oriented film is greater than zero and may be at least 0.005 or 0.0010%/micron film thickness.

The dielectric loss tangent as measured by dielectric relaxation has been found to correlate with the noisiness of the stretched films, e.g. as perceived by listening to the high-pitched crinkling sound of the rustling films when shaken by hand as might be experienced during use by a consumer. Dielectric loss tangent can be quantified with frequency in the audible range (e.g. from 20-20,000 Hz) and beyond. The lower the dielectric loss tangent, the louder/ nosier the film is when stimulated at a given frequency. One particularly useful guidepost for a high-pitched frequency is 1000 Hz which is very close to the classical soprano high C (1046.5 Hz). Cast, unoriented pure PLA film of very low crystallinity has a dielectric loss tangent under 0.0035 at 1000 Hz, whereas oriented, semi-crystalline pure PLA film has a dielectric loss tangent generally lower, such as less than 0.003, 0.025, or 0.002 at 1000 Hz. Preferred oriented, semi-crystalline films typically have a dielectric loss tangent of greater than 0.005, greater than 0.007 or greater than 0.010 at 1000 Hz. In some preferred oriented, semi-crystalline films typically have a dielectric loss tangent of greater than 0.005, greater than 0.007 or greater than 0.010 across the audible spectrum ranging from 20 to 20,000 Hz.

The dielectric loss tangent appears to increase with decreasing molecular weight of the polyvinyl acetate. Sound dampening thus improves with decreasing molecular weight in contrast to many other properties such as surface stickiness, shrinkage and optical haze that improve with increasing molecular weight. At constant PLA content, sound dampening can be further enhanced by increasing the relative proportion of polyvinyl acetate and reducing the concentration of plasticizer. The amount of plasticizer however must be balanced by other considerations. For example, it has been found that a small amount, e.g. at least 1 wt.-%, preferable at least 4 wt.-% aids in clean extrusion and casting with reduced build-up, e.g. of dimers or other debris. Thus an optimum composition balance between these components can be selected depending upon the particular balance of properties desired.

The oriented PLA-based films described herein can be used in a variety of products such as a packaging film or a tape backing.

The uniaxially oriented PLA-based films can exhibit hand tearability, as can be determined by the test method described in the examples. In some embodiments, the oriented film tears cleanly (defined as the deformation zone of the film where a jagged nub or stretched portion of the film extended was no more than 2 mm from the site of tear initiation at the film edge). These properties can be particularly advantageous for packaging film, tape backing, as well as other uses.

The biaxially orientated PLA-based films are typically tear resistant, as can be determined by the test method described in the examples. In some embodiments, the oriented films can be characterized as tear resistant with anti-slivering property, meaning that the films stretched or otherwise deformed but did not form a break at the edge.

The oriented film can be evaluated utilizing standard tensile and elongation testing as described in ASTM D882-10.

The oriented film can be evaluated utilizing standard tensile testing according to ASTM D882-10. The tensile strength at break of the film is typically at least 50, 100, or 150 MPa (in both machine and transverse direction for a biaxially oriented film) and typically less than the tensile strength of the PLA and polyvinyl acetate polymer utilized to make the film. In some embodiments, the tensile strength is no greater than 500, 400, 300, or 200 MPa. The elongation at break of the film (in both machine and transverse direction for a biaxially oriented film) is typically at least 20, 25, or 30%. In some embodiments, the elongation is no greater than 250 or 200%. The elongation in transverse direction can be greater than the elongation in machine direction. For example, in some embodiments, the elongation in machine direction ranges from 25 to 100%, whereas the elongation is transverse direction ranges from 150 to 250%. The tensile elastic modulus of the film is typically at least 500, 1000, 1500 or 2000 MPa. In some embodiments, the tensile modulus is no greater than 5000, 4000, or 3000 MPa. The tensile elastic modulus in machine direction can be greater than the tensile elastic modulus in transverse direction. For example, in some embodiments, the tensile elastic modulus in machine direction ranges from 2000 to 3000 MPa, whereas the tensile elastic modulus in transverse direction is at least 1000, but less than 2000 MPa.

In some embodiments, the hand tearable uniaxially oriented film has a tensile strength at break in both machine and transverse directions ranging from 10 to 50 MPa and in some embodiments, no greater than 45, 40, 35, 30 or 35 MPa. The elongation at break in transverse direction of the uniaxially oriented film can be less than the elongation at break in machine direction. In some embodiments, the elongation is less than 75% in transverse direction and ranges from 75 to 150% in machine direction. The tensile elastic modulus in transverse direction is typically higher than the tensile elastic modulus in machine direction. In some embodiments, the tensile elastic modulus in transverse direction ranges from 2500 to 5000 or greater MPa; wherein the tensile elastic modulus in machine direction may range from 1000 to 2000 MPa.

The (e.g. biaxially) oriented film can exhibit two Tgs. The first midpoint Tg, believed to be associated with the miscible mixture of PLA, polyvinyl acetate and plasticizer is in the same range as the composition, and cast unoriented film prepared from such composition. Thus, the first midpoint Tg is typically at least 40, 41 or 42° C. ranging up to 47, 48, 49, 50° C. or even 55, 60 or 65° C. The second Tg is typically greater than 0, 1, 2, 3, 4, or 5° C. and may range up to 10, 15, 20 or 25° C. The oriented films were found to possess crystallinity. The crystallinity was typically at least 5, 10, 15, 20, 25, or 30% ranging up to 45 or 50%. Upon adjusting the crystallinity on a PLA wt. % basis (dividing the measured crystallinity by the weight fraction of PLA), the crystallinities were found to be 56%, 55%, 56%, 56% and 57% for Example Films 6a-10a respectively.

The oriented PLA-based film described herein is suitable for use as a backing and/or a cover film of a (e.g. pressure sensitive) article. Thus, in other embodiments, articles are described comprising the oriented PLA-based film described herein and an adhesive (e.g. layer) disposed proximate a major (planar) surface of the oriented PLA-based film. The adhesive may be applied directly to the oriented PLA-based film or a primer may be disposed between the oriented PLA-based film and the adhesive. The article may be in the form of individual sheets or a (e.g. continuous) roll-good.

The PLA-based film may be subjected to customary surface treatments for better adhesion with the adjacent pressure sensitive adhesive layer. Surface treatments include for example exposure to ozone, exposure to flame, exposure to a high-voltage electric shock, treatment with ionizing radiation, and other chemical or physical oxidation treatments. Chemical surface treatments include primers. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. In one embodiment, the primer is an organic solvent based primer comprising acrylate polymer, chlorinated polyolefin, and epoxy resin as available from 3M Company as "3M™ Primer 94".

Various (e.g. pressure sensitive) adhesives can be applied to the PLA-based film such as natural or synthetic rubber-based pressure sensitive adhesives, acrylic pressure sensitive adhesives, vinyl alkyl ether pressure sensitive adhesives, silicone pressure sensitive adhesives, polyester pressure sensitive adhesives, polyamide pressure sensitive adhesives, poly-alpha-olefins, polyurethane pressure sensitive adhesives, and styrenic block copolymer based pressure sensitive adhesives. Pressure sensitive adhesives generally have a storage modulus (E') as can be measured by Dynamic Mechanical Analysis at room temperature (25° C.) of less than $3 \times 10^6$ dynes/cm at a frequency of 1 Hz.

In certain embodiments, the pressure sensitive adhesive may be natural-rubber-based, meaning that a natural rubber elastomer or elastomers make up at least about 20 wt. % of the elastomeric components of the adhesive (not including any filler, tackifying resin, etc.). In further embodiments, the natural rubber elastomer makes up at least about 50 wt. %, or at least about 80 wt. %, of the elastomeric components of the adhesive. In some embodiments, the natural rubber elastomer may be blended with one or more block copolymer thermoplastic elastomers (e.g., of the general type available under the trade designation KRATON from Kraton Polymers, Houston, Tex.). In specific embodiments, the natural rubber elastomer may be blended with a styrene-isoprene radial block copolymer), in combination with natural rubber elastomer, along with at least one tackifying resin. Adhesive compositions of this type are disclosed in further detail in US Patent Application Publication 2003/0215628 to Ma et al., incorporated by reference.

The pressure sensitive adhesives may be organic solvent-based, a water-based emulsion, hot melt (e.g. such as described in U.S. Pat. No. 6,294,249), heat activatable, as well as an actinic radiation (e.g. e-beam, ultraviolet) curable pressure sensitive adhesive. The heat activatable adhesives can be prepared from the same classes as previously described for the pressure sensitive adhesive. However, the components and concentrations thereof are selected such that the adhesive is heat activatable, rather than pressure sensitive, or a combination thereof.

In some embodiments, the adhesive layer is a repositionable adhesive layer. The term "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minn., USA.

The adhesive layer may also be a structured adhesive layer or an adhesive layer having at least one microstructured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The acrylic pressure sensitive adhesives may be produced by free-radical polymerization technique such as solution polymerization, bulk polymerization, or emulsion polymerization. The acrylic polymer may be of any type such as a random copolymer, a block copolymer, or a graft polymer. The polymerization may employ any of polymerization initiators and chain-transfer agents generally used.

The acrylic pressure sensitive adhesive comprises polymerized units of one or more (meth)acrylate ester monomers derived from a (e.g. non-tertiary) alcohol containing 1 to 14 carbon atoms and preferably an average of 4 to 12 carbon atoms. Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like.

The acrylic pressure sensitive adhesive comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In typical embodiments, the acrylic pressure sensitive adhesive comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, isodecyl (meth)acrylate, lauryl (meth)acrylate, as well as esters of (meth)acrylic acid with an alcohol derived from a renewable source, such as 2-octyl (meth)acrylate.

The acrylic pressure sensitive adhesive typically comprises at least 50, 55, 60, 65, 70, 75, 80, 85, 90 wt-% or greater of polymerized units of monofunctional alkyl (meth) acrylate monomer having a Tg of less than 0° C., based on the total weight of the polymerized units (i.e. excluding inorganic filler or other additives).

The acrylic pressure sensitive adhesive may further comprise at least one high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C. High Tg monofunctional alkyl (meth) acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

The acrylic pressure sensitive adhesive may further comprise polymerized units of polar monomers. Representative polar monomers include for example acid-functional monomers (e.g. acrylic acid, methacrylic acid), hydroxyl functional (meth)acrylate) monomers, nitrogen-containing monomers (e.g. acrylamides), and combinations thereof. In some embodiments, the acrylic pressure sensitive adhesive comprises at least 0.5, 1, 2 or 3 wt-% and typically no greater than 10 wt-% of polymerized units of polar monomers, such as acrylamide and/or acid-functional monomers such as (meth)acrylic acid.

The pressure sensitive adhesive may further include one or more suitable additives according to necessity. The additives are exemplified by crosslinking agents (e.g. multifunctional (meth)acrylate crosslinkers (e.g. TMPTA), epoxy crosslinking agents, isocyanate crosslinking agents, melamine crosslinking agents, aziridine crosslinking agents, etc.), tackifiers (e.g., phenol modified terpenes and rosin esters such as glycerol esters of rosin and pentaerythritol esters of rosin, as well as C5 and C9 hydrocarbon tackifiers), thickeners, plasticizers, fillers, antioxidants, ultraviolet absorbers, antistatic agents, surfactants, leveling agents, colorants, flame retardants, and silane coupling agents.

The (e.g. pressure sensitive) adhesive layer may be disposed upon the film by various customary coating methods (e.g. gravure) roller coating, flow coating, dip coating, spin coating, spray coating, knife coating, (e.g. rotary or slit) die coating, (e.g. hot melt) extrusion coating, and printing. The adhesive may be applied directly to the PLA film described herein or transfer coated by use of release liner. When a release liner is used, the adhesive is either coated on the liner and laminated to the film or coated on the film and the release liner subsequently applied to the adhesive layer. The adhesive layer may be applied as a continuous layer, or a patterned, discontinuous layer. The adhesive layer typically has a thickness of about 5 to about 50 micrometers.

In one embodiment, the release liner typically comprises paper or film, which has been coated or modified with compounds of low surface energy such as organosilicone compounds, fluoropolymers, polyurethanes and polyolefins. The release liner can also be a polymeric sheet produced from polyethylene, polypropylene, PVC, polyesters with or without the addition of adhesive-repellant compounds. As mentioned above, the release liner may have a microstructured or micro-embossed pattern for imparting a structure to the adhesive layer.

In some embodiments, the sheet, roll, or tape articles comprises a low adhesion backsize provided on a first major side the PLA-backing, such that when the sheet or tape is in roll, the outwardmost (exposed) surface of the pressure-sensitive adhesive comes in contact with the low adhesion backsize.

Various low adhesion backsize compositions have been described in the art such as, for example, silicone, polyethylene, polycarbamate, polyacrylics, and the like.

The composition of low adhesion backsize is chosen (e.g., in combination with the composition of pressure-sensitive adhesive to provide an appropriate level of release. In some embodiments, the low adhesion backsize may also provide an enhanced ability to anchor paint which is deposited thereupon, just as described in US 2014/0138025.

General categories of exemplary materials which may be suitable for inclusion in low adhesion backsize include e.g. (meth)acrylic polymers, urethane polymers, vinyl ester polymers, vinyl carbamate polymers, fluorine-containing polymers, silicone-containing polymers, and combinations thereof.

In some embodiments, the low adhesion backsize is an organic solvent-based solution or a water-based emulsion.

In some embodiments, low adhesion backsize may comprises an acrylic composition that may be prepared from the same (meth)acrylate monomers as the acrylic adhesive. However, the low adhesion backsize composition typically comprises a lower concentration of low Tg monomer, such as octadecyl acrylate and a higher amount of high Tg monomer such as acrylic acid. In some embodiments, the low adhesion backsize comprises at least 40, 45 or 50 wt.-% ranging up to about 60 wt-% of polymerized units of low Tg monomer such as octadecyl acrylate. The weight percentages in connection with the low adhesion backsize described herein are with respect to the total solids not including any organic or aqueous solvent unless otherwise noted.

Such compositions are described in further detail in U.S. Pat. No. 3,011,988 to Luedke et al., incorporated by reference.

In some embodiments, low adhesion backsize may comprise a discernable crystalline melting point ($T_m$), e.g. in compositions comprising appreciable quantities of monomer units which give rise to crystalline polymer segments. Such a $T_m$ may be present instead of, or along with, a $T_g$. In some embodiments, a Tm, if present, may range between e.g. 20° C. and 60° C.

In some embodiments, low adhesion backsize may include at least some (meth)acrylic acid groups. In some embodiments, concentration of (meth)acrylic acid groups is at least 2, 3, 4, or 5 wt.-% ranging up to 10, 15, or 20 wt.-%.

In some embodiments, low adhesion backsize may comprise a silicone-containing material. In various embodiments, such materials may comprise a silicone backbone with non-silicone (e.g., (meth)acrylate) side chains; a non-silicone (e.g., (meth)acrylate) backbone with silicone side chains; a copolymer backbone comprising silicone units and non-silicone (e.g., (meth)acrylate) units; and the like. Silicone-polyurea materials, silicone-polyurea-polyurethane materials, silicone-polyoxamide materials, siloxane-inifer-ter-derived compositions, and the like, may also be suitable.

In a certain embodiments, the silicone-containing material of low adhesion backsize comprises a reaction product of a vinyl-functional silicone macromer having the general formula of Formula I:

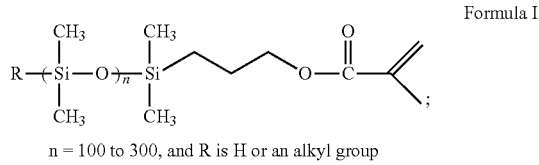

Formula I n = 100 to 300, and R is H or an alkyl group

In certain embodiments, the silicone-containing material of low adhesion backsize comprises a reaction product of a mercapto-functional silicone macromer having the general formula of Formula IIa, IIb, or IIc or mixtures thereof:

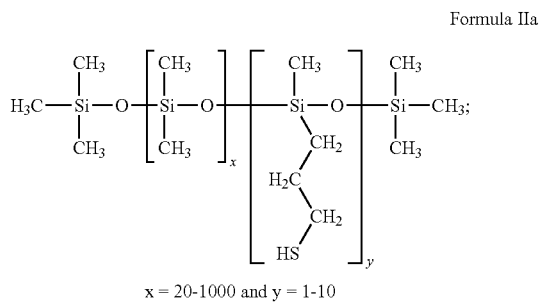

Formula IIa x = 20-1000 and y = 1-10

Formula IIb x = 20-1000

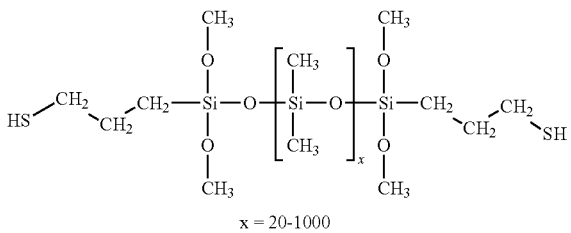

Formula IIc x = 20-1000

Further details of mercapto-functional silicone macromers and of the production of low adhesion backsize compositions using such macromers can be found in U.S. Pat. No. 5,032,460 to Kantner et al., which is incorporated by reference herein.

In various embodiments, any of the above silicone macromers may be used in combination with meth(acrylic) monomers and/or with any other vinyl monomers. Such monomers may be chosen, for example, in order to achieve any of the above-discussed glass transition temperature ranges. In some embodiments, the silicone macromer (e.g. of Formula IIa) may be used, at approximately 15-35 weight percent of the total reactants, with the balance of the reactants including at least one high $T_g$ (meth)acrylic monomer, at least one low $T_g$ (meth)acrylic monomer, and at least one (meth) acrylic acid monomer. In specific embodiments, the low $T_g$ monomer is methyl acrylate, the high $T_g$ monomer is methyl methacrylate, and the (meth)acrylic acid monomer is methacrylic acid. In further embodiments, in such compositions the silicone macromer (e.g. of Formula IIa) is used at approximately 20-30 wt. %.

In some embodiments comprising silicone macromers, the low adhesion backsize comprises at least 2, 3, 4, or 5 wt.-% of (meth)acrylic acid groups ranging up to 10, 15 or 20 wt.-%.

In some embodiments, the components of pressure-sensitive adhesive and the low adhesion backsize when present are chosen to provide good adhesion to a surface, while also being removable under moderate force without leaving a (e.g. visible) residue.

In other embodiments, the oriented film described herein comprises a low adhesion backside as previously described without an adhesive layer. Thus, in other embodiments, articles are described comprising the oriented PLA-based film described herein and a low adhesion backsize disposed proximate a major (planar) surface of the oriented PLA-based film. The low adhesion backsize may be applied directly to the oriented PLA-based film or a primer may be disposed between the oriented PLA-based film and the adhesive. When a (e.g. pressure sensitive) adhesive is present, the low adhesion backsize is present on the opposing major surface of the film or article. The article may be in the form of individual sheets or a (e.g. continuous) roll-good.

In some embodiments, the oriented film described herein may be disposed upon or bonded (e.g. with an adhesive) to a second layer. The second layer may be a backing disposed between the adhesive and the oriented PLA-based film and/or the second layer may be a transparent cover film disposed on the opposite major surface of the oriented PLA-based film. When the article comprises a second backing, the (e.g. pressure sensitive) adhesive may be disposed proximate a major surface of the backing. Further, when the article comprises a second cover film, the low adhesion backsize may be disposed proximate the second cover film.

The backing can comprise a variety of flexible and inflexible (e.g. preformed web) substrates including but not limited to polymeric films, metal foils, foams, paper, and combinations thereof (e.g. metalized polymeric film). Polymeric films include for example polyolefins such as polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, ethyl cellulose, as well as bio-based material such as polylactic acid (PLA).

In another embodiment, the oriented film or backing may further comprise a metal or metal oxide layer. Examples of metals include aluminum, silicon, magnesium, palladium, zinc, tin, nickel, silver, copper, gold, indium, stainless steel, chromium, titanium, and so on. Examples of metal oxides used in the metal oxide layer include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide, and so on. These metals and metal oxides may be used singly or in combination of two or more. Layers of these metals and/or metal oxides can be formed by known methods such as vacuum deposition, ion plating, sputtering, and CVD (Chemical Vapor Deposition). The thickness of the metal and/or metal oxide layer is typically at least 5 nm ranging up to 100 or 250 nm.

The thickness of the backing is typically at least 10, 15, 20, or 25 microns (1 mil) and typically no greater than 500 microns (20 mil) thickness. In some embodiments, the thickness of the backing is no greater than 400, 300, 200, or 100 microns. The first film layer and second (e.g. film) layer may have the same thickness as the backing. However, the first and/or second (e.g. film) layer, particularly when utilized in combination with a backing, may be less than 10 microns. In some embodiments, the first and/or second film layer is typically at least 250 nm, 500 nm, 750 nm or 1 micron. The backing as well as the overall film is typically in the form of a roll-good, but may also be in the form of individual sheets.

In some embodiments, the second layer (e.g. backing or cover film) is a thermoplastic polymer film such as polycarbonate, polyethylene terephthalate, polyamide, polyethylene, polypropylene, polystyren, polyvinyl chloride, poly(meth)acrylic polymers, ABS (acrylonitrile-butadiene-styrene copolymer) resins, and the like. In some embodiments, the backing, cover film, or overall film is transparent having a transmission of visible light of at least 90 percent.

In some embodiments, the backing, cover film, or overall film is conformable. By "conformable" it is meant that the film or film layer is sufficiently soft and flexible such that it accommodates curves, depressions, or projections on a substrate surface so that the film may be stretched around curves or projections, or may be pressed down into depressions without breaking or delaminating the film. It is also desirable that the film does not delaminate or release from the substrate surface after application (known as popping-up).

Suitable conformable second film layers include, for example, polyvinyl chloride (PVC), plasticized polyvinyl chloride, polyurethane, polyethylene, polypropylene, fluoropolymer or the like. Other polymer blends are also potentially suitable, including for example thermoplastic polyurethane and a cellulose ester.

In some embodiments, the film is sufficiently conformable such that it is "transversely curvable" meaning that the tape can be curved into a continuous curved shape (e.g. with a radius of curvature of 7.5 cm) that lies in a generally flat plane, without through-tearing of the stretched area of the curved portion of the tape. An example of a transversely curvable tape is depicted in FIG. 15 of US2014/0138025.

Definitions of Terms to be Used in the Examples

Films were cast and wound along the machine direction (MD), also called the "x" direction. Films were stretched along MD to a machine direction draw ratio (MDDR) and/or stretched along the transverse direction (TD), also called the "y" direction, to a transverse direction draw ratio (TDDR). The thickness direction is also referred to as the "z" direction. These directions are approximately the principal directions for stretching, and for properties (such as refractive indices) for samples taken from the middle of a stretched part. These directions thus also define a Cartesian coordinate system for the samples.

Test Methods

Glass transition temperatures of the materials and films were measured using Differential Scanning calorimetry (DSC). The specimens were prepared for analysis by weighing and loading the material into TA Instruments aluminum DSC sample pans. The specimens were analyzed using a TA Instruments Q2000 (SN#130) Differential Scanning calorimeter (TA Instruments, New Castle, Del., USA) utilizing a heat-cool-heat method in standard mode (−90 to 180° C. at 10° C./min.). The upper temperature range is chosen to melt the crystalline structure previously formed. After data collection, the thermal transitions were evaluated using the Universal Analysis Software Package. Any observed glass transitions (Tg), endothermic or exothermic peaks were evaluated. The glass transition temperatures were evaluated using the step change in the standard heat flow (HF) curves. The onset, midpoint (half height), and end temperatures of the transition were noted as well as the change in heat capacity observed at the glass transition. If only one value is cited, it is the midpoint (half-height) value of the glass transition. In the case of cast and oriented film the midpoint (half-height) value of the first heating cycle was reported. In case of the PLA and PVAc polymers, the midpoint (half-height) value of the second heating cycle was reported. In general, the first heating cycle is used to analyze the film and its properties as influenced by the processes that made it; whereas, the second heating cycle is used to analyze the resin and resin mixture properties as well as to discern these properties from an existing film. Any peak transitions were also evaluated; and peak area values and/or peak minimum/maximum temperatures were determined. Peak integration results were normalized for sample weight and reported in J/g. The initial crystallinity of the films was estimated by scaling these peak integrations with the theoretical heat of fusion, i.e. 93.1 J/g (cf Polylactic Acid Technology, D. E. Henton et al, 2005, pps. 527-578)

Refractive indices in the three principal directions were measured using a Metricon Prism Coupler (Metricon, Piscataway, N.J., USA). Unless otherwise noted, measurements were taken at 632.8 nm. In some cases, refractive index measurements were taken using three different lasers at 404 nm, 532 nm and 632.8 nm respectively. In these specific cases, presented in FIG. 3, the refractive index dispersion curve with respect to wavelength was estimated by fitting these data to Cauchy's equation, e.g. as described in F. A.

Jenkins and H. E. White, *Fundamentals of Optics*, 4th ed., McGraw-Hill, Inc. (1981). For these specific cases, a direct estimate was made of the refractive index as would be measured at 589 nm, which is the refractive index value typically taken by a standard Abbe refractometer (e.g. a NAR-1T SOLID from Atago Company Ltd., Tokyo, Japan). The dispersion curves suggest an increase of the refractive index in the thickness direction between 0.0015 and 0.0020 from the 632.8 nm values to the 589 nm values. Unless the dispersion curve was derived for the specific sample, the lower correction of 0.0015 was added to measured value at 632.8 nm for the given sample to provide the value reported in the Tables.

Percent transmission, haze, and clarity were measured on a Hazegard Plus-™ (BYK Gardner, Silver Spring, Md., USA).

Film shrinkage measurements were taken in general accord with ASTM D1204 with the modifications as now described. Opposing pairs of measuring lines on the film were marked in each direction on the films. Their separation was measured before and after heating to determine the changes in separation, wherein the shrinkage was calculated as the negative change in length divided by the initial separation (and expressed as a percentage). The initial length of the sample ranged between 2 and 20 cm, depending on the test and the instrument used to measure the line separation. An optical gauge, for example, was used to measure the line separations very precisely. The film was generally unconstrained in both in-plane directions (MD and TD). A film to be tested was dusted with cornstarch to prevent it from sticking to the testing apparatus and placed on an aluminum pan. Pans containing film specimens were placed in a preheated batch oven for 5 minutes at 120° C., removed, cooled, and then the film specimens were measured. Generally, shrinkage measurements reported were an average of three specimens averaged over both MD and TD values for biaxially drawn films and presented independently in MD and TD for uniaxially drawn films The dielectric properties and electrical conductivity measurements were performed with the Alpha-A High Temperature Broadband Dielectric Spectrometer modular measurement system from Novocontrol Technologies (Montabaur, Germany). The testing was implemented using the sample cell BDS 1200 utilizing gold plated parallel plates of 40 mm diameter that created a three-layer sandwich with the material under test. Each specimen was prepared between parallel plate electrodes with spacing d, where d was the thickness of the material under test in mm. The complex permittivity (identical to the dielectric constant and loss) were evaluated from the phase sensitive measurement of the electrodes voltage difference (Vs) and current (Is). Frequency domain measurements were carried out at discrete frequencies from 0.01 Hz to 20 MHz. Impedances from 10 milli-Ohms up to 1×10 E14 ohms were measured up to a maximum of 4.2 volts AC. All measurements were within the recommended ranges for the utilization of this instrument. For this procedure, a fixed AC voltage of 1.0 volts was used. The values of the dielectric loss tangent were calculated from the ratio of the dielectric loss to dielectric constant. The dielectric loss tangent is less sensitive to the error pockets caused by air between the sample surface and the gold plated electrodes. The procedures of these measurements were guided by ASTM D150, and the Novocontrol Alpha-A High Temperature Broadband Dielectric Spectrometer has been designed to run in accordance with ASTM D150.

Tensile measurements were performed in MD and TD on selected films using methods in general accord with ASTM D882-10.

Hand tearability of the film was performed using a qualitative test. Film was cut into square or rectangular pieces at least 2″ in width and length so that the edges coincided with the MD and TD. A given film piece was grasped by index finger and opposing thumb of each hand so that the index fingers of each hand and the thumbs of each hand touched. In this manner, the line of contact between the index fingers of each hand defined the direction of intended tear, e.g. along the MD or TD direction. The film was positioned so that the edge to be torn was perpendicular to the intended direction of the tear and the pads of the fingers were located as close to the edge while still remaining fully on the flat surfaces of the film. The film was grasped tightly by these fingers of both hands. To initiate the tear, the grasping fingers were rotated in opposing directions using the edge of the film as the axis of rotation at a rate of at least 360 degrees per second for an extent of at least 180 degrees. Films were considered hand tearable if the film tore. The films were considered tear resistant if the films stretched or otherwise deformed but did not form a tear initiating from the edge. The film was considered to tear cleanly if the deformation zone of the film where a jagged nub or stretched portion of the film extended was no more than 2 mm from the site of tear initiation at the film edge. When the film was hand tearable, the film was then further torn by gently pulling the film in opposite directions using the still gripped finger holds. The directionality and ease of tear propagation was thus noted. The films were considered tear resistant with anti-slivering property if the films stretched or otherwise deformed but did not form a break at the edge.

EXAMPLES

For the following comparative examples and examples the Polylactic Acid (PLA) polymer was Ingeo™ 4032 D available from NatureWorks LLC, Minnetonka, Minn. USA and the plasticizer was Hallgreen™ R-8010 plasticizer available from Hallstar Co., Chicago, Ill., USA unless specified otherwise.

The Tg of the Ingeo™ 4032 D PLA polymer and Vinnapas™ B60 PVAc were determined using the DSC test method previously described. The half-height Tg of the Ingeo™ 4032 D PLA polymer was determined to be 54° C. The half-height Tg of the Vinnapas' B60 PVAc polymer was determined to be 43° C.

Comparative Examples 1: Pure Polylactic Acid Film

For Comparative Example 1A, Polylactic Acid (PLA) resin was extruded using a Berstorff 25 mm Twin Screw Extruder KraussMaffei Berstorff GmbH, Hannover, Germany) by feeding the resin pellets into the extruder throat. The pellets were dried prior to extrusion for over 8 hours at 70° C. and vacuum was also applied in the extruder. The temperature was monotonically increased along the extruder barrel to a final zone temperature of 202° C. The melt was conveyed through the melt train and die, also set to 202° C., and finally cast with electrostatic pinning onto a chrome-plated casting wheel cooled to 27° C. The cast film had a final thickness of approximately 250 microns with relatively low haze and high clarity. The Dielectric Loss Tangent at 1000 Hz was found to be 0.0034.

The cast film was subsequently stretched to make a biaxially oriented film using the KARO IV™ batch stretcher (available from Brückner Maschinenbau GmbH & Co. KG, Siegsdorf. Germany). The films were inserted into the pantograph gripping mechanism such that the MD direction of the cast roll was the same as the MD direction of the KARO IV. The films were pre-heated at the stretch temperature of 85° C. for 120 seconds, and drawn simultaneously in MD and TD at a nominal initial rate of 100%/s to the peak draw ratios of 4.0 and 4.0, respectively. The films were then reduced at a rate of 10%/s to final draw ratios of 3.5 and 3.5 respectively. The relaxed films were heat set at 155° C. for 20 seconds 10%/s and then quenched back to room temperature while still constrained for 30 seconds. The Dielectric Loss Tangent at 1000 Hz was found to be 0.0021. Thus, the Dielectric Loss Tangent decreased, meaning that the film became noisier, after orientation. The frequency response of the Dielectric Loss Tangent is presented in FIG. 1.

For Comparative Example 1B, a cast film made similarly to Comparative Example 1A but about 450 microns thick, was stretched using a continuous drawing process. The cast film was conveyed into a length orienter, preheated to an initial temperature of 60° C., further heated with an infra-red lamp and stretched to a draw ratio of 3.3. The film was then conveyed into a conventional tenter, preheated to 80° C. and drawn transversely to a peak nominal draw ratio of 4.4. The film experienced a nominal strain reduction of about 0.5, heat set at 155° C., experienced another nominal strain reduction of about 0.1 after heating setting and during quenching, resulting in a final nominal draw ratio of 3.8, before slitting and winding into a roll of film. The final stretched and oriented film was about 35 microns thick with a refractive index in the thickness direction of 1.445. The film exhibited a haze of 2.0%, e.g. 0.058%/micron. Mechanical testing at room temperature revealed an Elastic Modulus of 570 kpsia (3931 MPa), an Elongation-to-Break of 46% and a Break Strength of 15.3 kpsia (105 MPa) in the MD; and, an Elastic Modulus of 665 kpsia (4588 MPa), an Elongation-to-Break of 52% and a Break Strength of 22.6 kpsia (156 MPa) in the TD. The Dielectric Loss Tangent at 1000 Hz was found to be 0.0020, also noiser after orientation. The frequency response of the Dielectric Loss Tangent is presented in FIG. 1.

Comparative Examples 2: PLA with PVAc Only

A blend of 97 wt. % polylactic acid (PLA) resin and 3 wt. % polyvinyl acetate (Vinnapas™ B5, available from Wacker Chemie AG, Muenchen, Germany) was extruded using a Berstorff 25 mm Twin Screw Extruder KraussMaffei Berstorff GmbH, Hannover, Germany) by feeding the resin pellets into the extruder throat chilled to 90° C. The temperature was monotonically increased along the extruder barrel to a final zone temperature of 202° C. The melt was conveyed through the melt train and die, also set to 202° C., and finally cast with electrostatic pinning onto a chrome-plated casting wheel cooled to 27° C. The cast thickness was about 600 microns.

The cast film was subsequently stretched to make a biaxially oriented film using the KARO IV™ batch stretcher (available from Brückner Maschinenbau GmbH & Co. KG, Siegsdorf. Germany). The films were inserted into the pantograph gripping mechanism such that the MD direction of the cast roll was the same as the MD direction of the KARO IV. The films were pre-heated at the stretch temperature of 80° C. for 120 seconds, and drawn simultaneously in MD and TD at a nominal initial rate of 100%/s to the peak draw ratios of 3.5 and 3.5, respectively. The final film was approximately 60 microns thick. The refractive indices in the MD, TD and thickness direction were 1.458, 1.459 and 1.450 at 633 nm. The haze was 2.9%, e.g. 0.048% per micron. The Dielectric Loss Tangent as a function of frequency is presented in FIG. 1 with a value at 1000 Hz of 0.0025. The frequency response of the Dielectric Loss Tangent is presented in FIG. 1.

Comparative Examples 3: PLA with Plasticizer Only

For Comparative Example 3A, a blend of 90 wt. % polylactic acid (PLA) resin and 10 wt. % plasticizer was extruded using a Berstorff 25 mm Twin Screw Extruder KraussMaffei Berstorff GmbH, Hannover, Germany). The dried PLA pellets were fed into the extruder throat at a fixed massed flow rate using a gravimetric feeder. The plasticizer was injected into an extruder barrel mixing zone using a heated pump with a flow meter (e.g. a Dynamelt-™ S series Adhesive Supply Unit as available from ITW Dynatec, Hendersonville, Tenn., USA). The temperature was monotonically increased along the extruder barrel to a final zone temperature of 202° C. The melt was conveyed through the melt train and die, also set to 202° C., and finally cast with electrostatic pinning onto a chrome-plated casting wheel cooled to 27° C. The film was cast to a final thickness of approximately 250 microns. The refractive index was isotropic with a value of 1.4597 at 633 nm. The Dielectric Loss Tangent at 1000 Hz was found to be 0.0031, similar to the cast film of Comparative Example 1. The frequency response of the Dielectric Loss Tangent is presented in FIG. 1.

The cast film was subsequently stretched to make a biaxially oriented film using the KARO IV™ batch stretcher (available from Brückner Maschinenbau GmbH & Co. KG, Siegsdorf. Germany). The films were inserted into the pantograph gripping mechanism such that the MD direction of the cast roll was the same as the MD direction of the KARO-™ IV. The film was pre-heated at the stretch temperature of 76° C. for 120 seconds, and drawn simultaneously in MD and TD at a nominal initial rate of 100%/s to the peak draw ratios of 4.0 and 4.0, respectively. The films were then reduced at a rate of 10%/s to final draw ratios of 3.5 and 3.5 respectively. The relaxed films were heat set at 155° C. for 20 seconds and then quenched back to room temperature while still constrained for 30 seconds. The Dielectric Loss Tangent as a function of frequency is presented in FIG. 1 with a value at 1000 Hz of 0.0047.

For Comparative Example 3B, a blend of 80 wt. % polylactic acid (PLA) resin and 20 wt. % plasticizer was cast into a film and furthermore stretched into an oriented film in analogy to Comparative Example 3A. The cast film and stretched film were both greasy to the touch indicating an over-loading of the plasticizer.

For Comparative Example 3C, a blend of 83.3 wt. % polylactic acid (PLA) resin and 16.7 wt. % plasticizer was cast into a film analogously to Comparative Example 3A. Using the KARO-™ IV, the film was pre-heated at the stretch temperature of 65° C. for 120 seconds, and drawn simultaneously in MD and TD at a nominal initial rate of 100%/s to the peak nominal draw ratios of 4.0 and 4.0, respectively, and heat set at 155° C. for 20 seconds and quenched back to room temperature while still constrained for 30 seconds. The cast film and stretched film were non-greasy to touch and embody an estimated maximum loading into a film with this plasticizer and PLA only. The sample-averaged Dielectric Loss Tangent as a function of frequency is presented in FIG. 1 with a value at 1000 Hz of 0.0062. The frequency response of the Dielectric Loss Tangent is presented in FIG. 1.

Examples 1-5: Cast Films Comprising PLA, PVAc and Plasticizer

A first set of films were prepared by extrusion casting. As these are precursors to the final oriented films, they are referred to as "cast films." The compositions and cast film attributes are summarized in Table 1:

TABLE 1

| Example# | PVAc | PVAc MW (g/mole) | RI | % Transmission | % Haze | % Clarity |
|---|---|---|---|---|---|---|
| 1 | B1.5 | 15,000 | 1.4604 | 93.8 | 2.01 | 99.1 |
| 2 | B5 | 25,000 | 1.4595 | 94.6 | 1.71 | 99.6 |
| 3 | B60 | 65,000 | 1.4595 | 95.1 | 1.19 | 99.7 |
| 4 | UW2FS | 160,000 | 1.4605 | 94.6 | 1.01 | 99.6 |
| 5 | UW25FS | 460,000 | 1.4598 | 94.4 | 2.01 | 95.8 |

Examples 1-5 were compositions comprising 74 wt. % polylactic acid, 16 wt. % polyvinyl acetate polymer and 10 wt. % plasticizer. The polyvinyl acetates (PVAc) chosen were various grades of Vinnapas™, specified in Table 1, available from Wacker Chemie AG, Muenchen, Germany. The molecular weight (MW) (measured using Gel Permeation Chromatography (GPC), as calibrated using polystyrene (PS) standards) of Table 1 were taken from the corresponding Wacker Technical Data Sheets. The cast refractive index (RI) was measured at 632.8 nm.

The polymeric materials were extruded using a Berstorff 25 mm Twin Screw Extruder KraussMaffei Berstorff GmbH, Hannover, Germany) by feeding the resin pellets into the extruder throat at a fixed massed flow rate using two gravimetric feeders. The throat was cooled to 90° C. The plasticizer was injected into an extruder barrel mixing zone using a heated pump with a flow meter (e.g. a Dynamelt™ S series Adhesive Supply Unit as available from ITW Dynatec, Hendersonville, Tenn., USA). The temperature was monotonically increased along the extruder barrel to a final zone temperature of 202° C. The melt was conveyed through the melt train and die, also set to 202° C., and finally cast with electrostatic pinning onto a chrome-plated casting wheel cooled to 27° C. All cast webs were thus cast to a final thickness of approximately 250 microns. The haze, clarity, and refractive index of the cast films were measured and are reported in Table 1.

Cast films Examples 1-5 were analyzed using DSC according to the method previously described. The measurements revealed a defined, single Tg for each cast film. For all the cast films, the onset temperatures were at least 40° C. and the endpoints were no more than 50° C. For Example Films 1-5, the mid-point (half height) Tgs were 42° C., 43° C., 43° C., 42° C. and 47° C., respectively. These glass transition values were used to guide the subsequent stretching conditions for Examples 6-10. Further, analysis of the peak area for each showed a net area of ~0 J/g, i.e. the cast films were each amorphous as made.

The Dielectric Loss Tangent was measured for each of the cast films of these Examples. The values at 1 kHz were found to be 0.005 or less in each case.

Examples 6-10: Biaxially Oriented Films with Varied Strain Relaxation after Stretching Cast film precursor Examples 1-5 were stretched to make biaxially oriented film Examples 7-12, respectively, using the KARO IV™ batch stretcher (available from Brückner Maschinenbau GmbH & Co. KG, Siegsdorf. Germany). In order to find optimized conditions, a variety of draw profiles with different levels of the peak draw ratio and different strain relaxation steps were used. In all cases, the films were stretched to peak nominal draw ratios in a first step. In most cases, an initial strain relaxation was then performed, reducing the nominal draw ratios to the operative values during heat setting. Third, a final strain relaxation was performed in some cases, reducing the nominal draw ratios again (by the amount indicated as "$2^{nd}$ toe-in") to the final nominal draw ratios at quenching.

In this manner, conditions were approximately optimized simulating "best case" scenarios that (a) could be manufactured using a simultaneous biaxial tenter (e.g. using a LISM line as available from Brueckner) or (b) that could be manufactured using a sequential process with MD orientation in a length orienter followed by TD orientation in a conventional tenter. Thus in Case (a) the film was stretched biaxially followed by a biaxial strain reduction (toe-in) in both MD and TD and subsequent heat setting; whereas in Case (b) the film was stretched biaxially followed by a strain reduction (toe-in) in TD only and subsequent heat setting. Thus, Example Cast Films 1-5 were stretched to make Example Oriented Films 6-10 respectively for both draw profiles (a) and (b). Thus, the films were inserted into the pantograph gripping mechanism such that the MD direction of the cast roll was the same as the MD direction of the KARO IV. The films were pre-heated at the stretch temperature for 120 seconds, and drawn simultaneously in MD and TD at a nominal initial rate of 100%/s to the peak draw ratios of 4×4 for Case (a) and 3.5×3.8 for Case (b). The stretch temperature was 72° C. for all films. The films were then reduced to final nominal draw ratios of 3.5×3.5 using a rate of 10%/sec. Finally, the films were heat set at 155° C. for 20 seconds and then quenched back to room temperature while still constrained for 30 seconds. Table 2 presents the resulting Effective Total Birefringence (ETB), measured % Haze, % Haze/micron, % Shrinkage and estimated thickness (or "z") refractive index at 589 nm for each of these Example Films for both Cases (a) and (b).

TABLE 2

| Example | ETB | % Haze | % H/micron | % Shrink | nz, thick |
|---|---|---|---|---|---|
| 6a | 0.027 | 5.3 | 0.25 | 3.9 | 1.454 |
| 7a | 0.026 | 6.3 | 0.27 | 3.9 | 1.454 |
| 8a | 0.026 | 2.5 | 0.12 | 3.1 | 1.454 |
| 9a | 0.026 | 0.71 | 0.031 | 2.5 | 1.456 |

TABLE 2-continued

| Example | ETB | % Haze | % H/micron | % Shrink | nz, thick |
|---|---|---|---|---|---|
| 10a | 0.026 | 0.50 | 0.023 | 2.8 | 1.455 |
| 6b | 0.026 | 2.3 | 0.12 | 4.4 | 1.454 |
| 7b | 0.026 | 3.6 | 0.17 | 3.9 | 1.454 |
| 8b | 0.026 | 4.2 | 0.18 | 2.5 | 1.454 |
| 9b | 0.026 | 0.70 | 0.034 | 2.5 | 1.455 |
| 10b | 0.026 | 0.50 | 0.025 | 3.7 | 1.455 |

Given that the effective total birefringence of these films were about 0.026, the total birefringence of these films without compositional weighting were about 0.019.

As is evident from the data of Table 2, Case (a) achieves better shrinkage results than Case (b) as might be expect; however, the general trend maintains under both cases: the haze and shrinkage generally declines with increasing molecular weight of the polyvinyl acetate. The lowest shrinkage was obtained with Example Films 9a and 9b.

The oriented films of case (a) were analyzed using DSC according to the method previously described. Two Tgs were evident. The higher midpoint Tg, believed to be associated with the mixture of PLA, polyvinyl acetate and plasticizer were found to be 48° C., 47° C., 48° C., 46° C. and 46° C. for Examples 6a-10a respectively. The lower Tgs were 8° C., 11° C., 12° C., 16° C. and 15° C. for Examples 6a-10a respectively. The oriented films were found to possess a very high level of crystallinity around 40%.

Upon adjusting the crystallinity on a PLA wt. % basis, the crystallinities were found to be 56%, 55%, 56%, 56% and 57% for Example Films 6a-10a respectively. Thus, the Example films achieved crystallinities in par with that for highly oriented pure PLA films on a PLA weight basis.

Figure 2A:
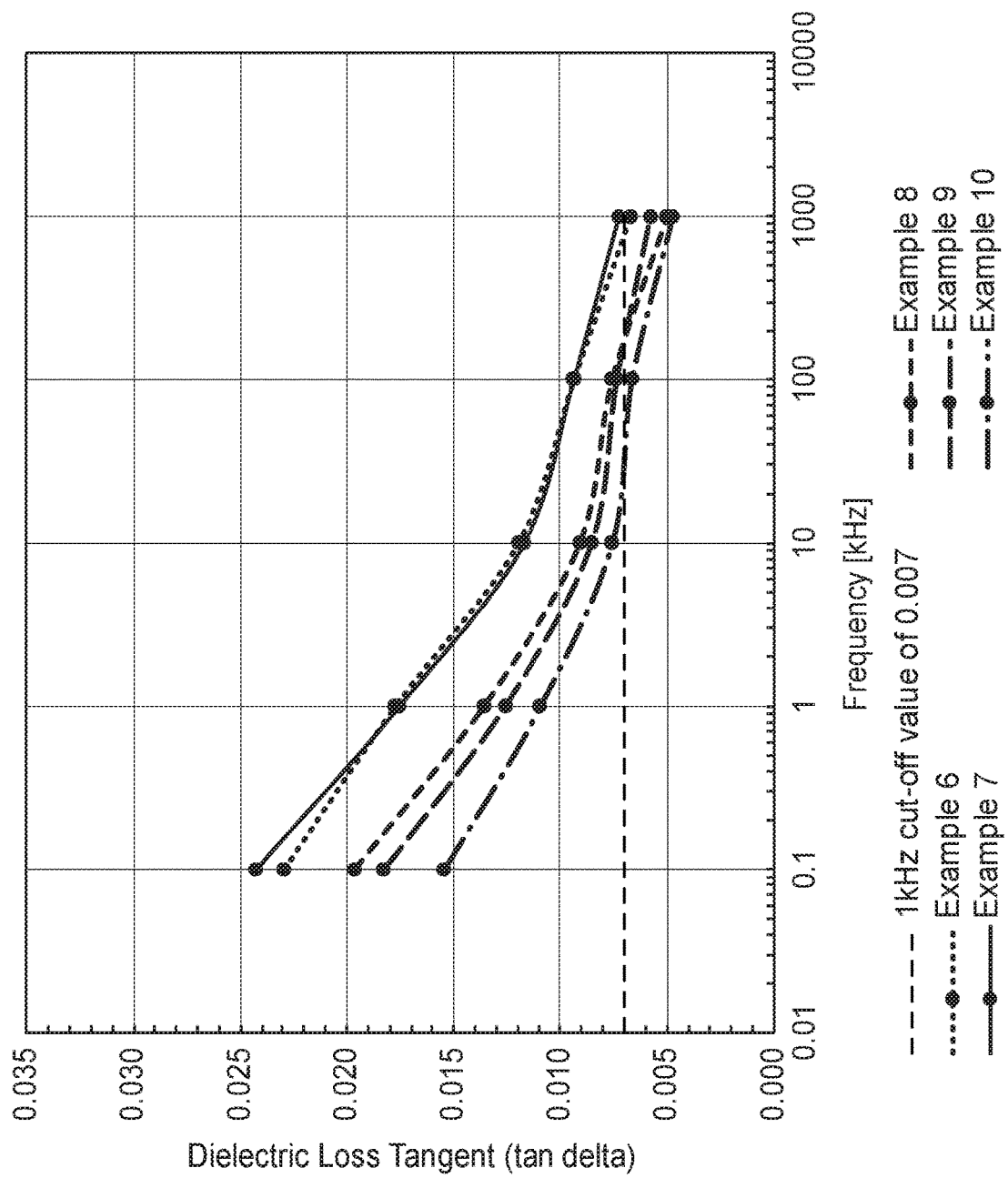
FIGS. 2A and 2B are the dielectric loss tangent as a function of frequency of various embodied oriented films.

Dielectric Loss Tangents were measured for films of Examples 6-10. Whereas the pure PLA of Comparative Example 1 exhibits a dielectric loss under 0.003 at 1 kHz, and the cast films of Examples 1-5 exhibit a Dielectric Loss Tangent under 0.005 at 1 kHz, all the stretched, oriented films of Examples 6-10 had Dielectric Loss Tangents over 0.007 at 1 kHz. At constant weight compositions, Examples 6-10 indicate that the Dielectric Loss Tangent (sound dampening) generally increases with decreasing molecular weight of the polyvinyl acetate with Dielectric Loss Tangents at 1000 Hz of 0.0177, 0.0175, 0.0136, 0.0126 and 0.0109, respectively. For this property, lower molecular weights polyvinyl acetate appear to present an advantage. The frequency response from 0.01 to 1000 KHz (10 to 1,000,000 Hz) of the Dielectric Loss Tangent is presented in FIG. 2A.

Figure 3:
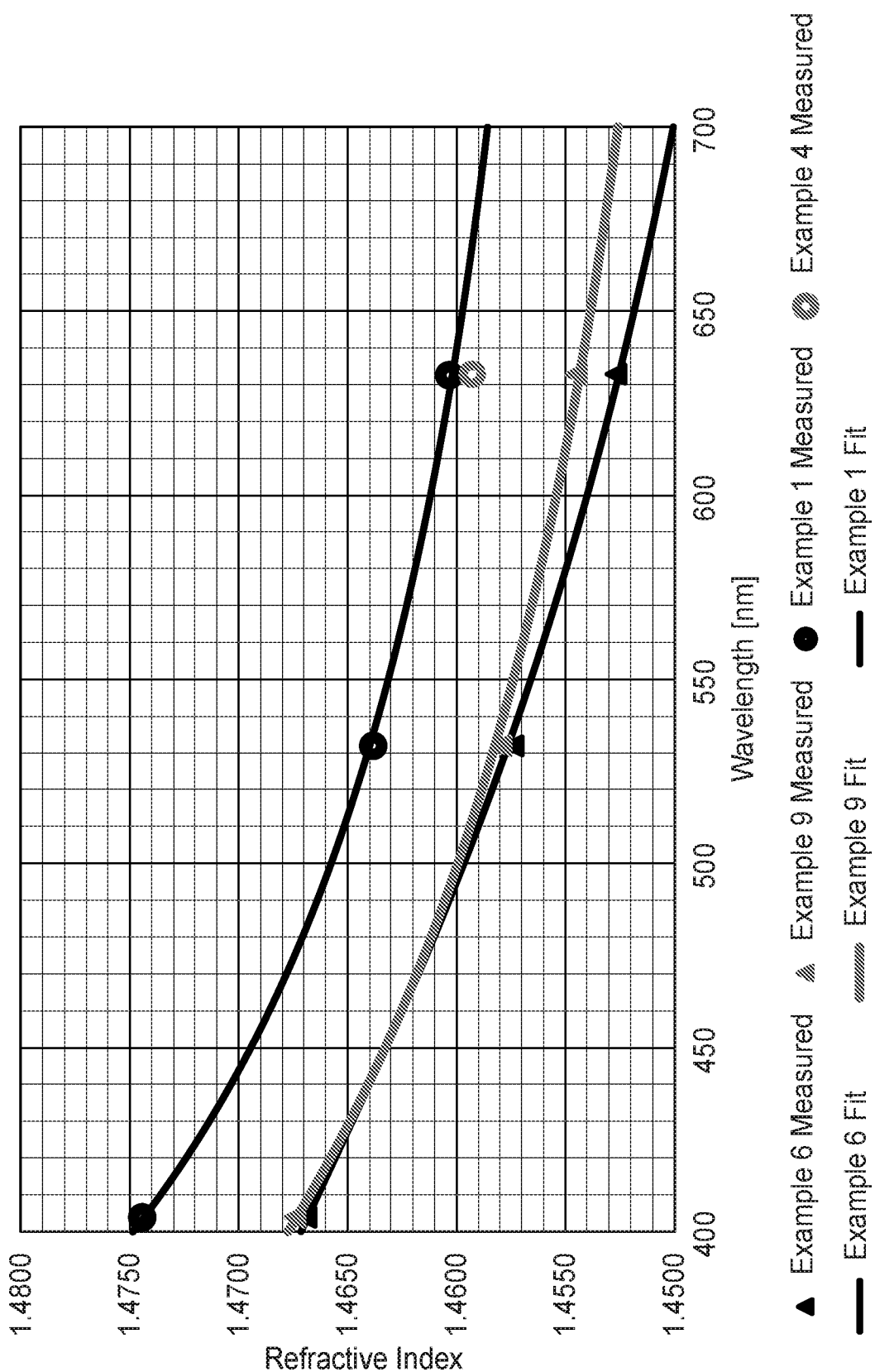
FIG. 3 is the calculated refractive index dispersion curves of various embodied films.

Finally, FIG. 3 presents refractive index data for some exemplified films as a function of wavelength. The refractive index portrayed is the operative index for light polarized in the thickness or so-called z direction. The data points are measured values. The curves are the data fit to the Cauchy equation. This index is a useful measure of overall orientation. FIG. 4 demonstrates that at least some, e.g. Example 9a with a value of 1.456, had "z" refractive index, estimated at 589 nm, of at least 1.455.

Examples 11-12: Uniaxially Oriented Films with Various Strain Relaxation after Stretching Cast web precursor Examples 1 and 4 were stretched to make uniaxially oriented film Examples 11 and 12, respectively, using the KARO IV™ batch stretcher. Films drawn only nominally in one direction of this device tend to draw inwards in the perpendicular direction because the film is only partially supported by the physical grippers along those edges. For example, if the film is nominally drawn only in TD, the MDDR decreases below unity. In order to simulate a uniaxial stretch that would be anticipated on a conventional tenter, the film was nominally drawn simultaneously in both directions so that the final measured draw ratio in MDDR was actually maintained at unity after stretching. Thus, the films were inserted into the pantograph gripping mechanism such that the MD direction of the cast roll was the same as the MD direction of the KARO IV. The films were pre-heated at the stretch temperature for 120 seconds at 76° C., and drawn simultaneously in MD and TD at a nominal initial rate of 100%/s in TD and a commensurate rate in MD to simultaneously achieve their nominal peak draw ratios. The films were then heat set at 155° C. for 20 seconds under a variety of different post-drawing strain-relaxation schemes at a TD nominal rate of 10%/s to result in a reduced final TDDR and then quenched back to room temperature while still constrained for 30 seconds. The resulting films of these examples were approximately 50 microns thick. Thus in analogy to Examples 6-10, approximately optimized process drawing conditions were found for these films. Table 3 presents two process cases for each example film.

TABLE 3

| Example | ETB | % Haze | % H/micron | % MD Shrink | % TD Shrink | % Ave. Shrink |
|---|---|---|---|---|---|---|
| 11a | 0.026 | 7.5 | 0.15 | 0.9 | 3.5 | 2.2 |
| 11b | 0.027 | 7.9 | 0.16 | 0.7 | 3.1 | 1.9 |
| 12a | 0.027 | 5.1 | 0.10 | 0.6 | 3.2 | 1.9 |
| 12b | 0.027 | 6.0 | 0.12 | 0.5 | 3.1 | 1.8 |

Given that the effective total birefringence of these films were about 0.027, the total birefringence of these films without compositional weighting were about 0.020.

In case (a), the films were stretched to a peak draw ratio of 5.8 and then reduced in strain to a final draw ratio of 5.3. The film was nominally drawn 1.35 in the cross direction to achieve a final true draw ratio of nearly unity, consistent with film stretched in a conventional tenter. In case (b), the films were stretched to a peak draw ratio of 6.0 and then reduced in strain to a final draw ratio of 5.3. The film was nominally drawn 1.40 in the cross direction to achieve a final true draw ratio of nearly unity, consistent with film stretched in a conventional tenter. Again, in analogy to Examples 6-10, the higher molecular weight polyvinyl acetate in Example 12 resulted in lower haze and shrinkage than its lower molecular weight analogue of Example 11.

The Example films 11a, 11b, 12a, and 12b were also tested for hand tearability. Each was found to be hand tearable with clean tear initiation along TD. The higher draw ratio generally had the most clean tear initiation. The tear also continued to propagate smoothly and preferentially along the TD stretch axis. Finally, both films were tear resistant in MD providing the material with anti-slivering when used as a tape substrate for a roll of tape wound along MD.

Example 13: Biaxially Oriented Films with Different PVAc and Plasticizer Loading A cast web precursor analogous to Example 5 was made using the same highest molecular weight PVAc, except that only 13 wt. % PVAc and 8 wt. % plasticizer was used with 79 wt. % PLA. The cast film was stretched to make biaxially oriented Example Film13 using the KARO IV™ batch stretcher. As with the previous Example Films 6-10, a variety of conditions were explored to approximately optimize draw conditions. The best process conditions, using case (b) from Examples 6-10, resulted in films with an effective total birefringence (ETB) of 0.028 (corresponding to a total birefringence of 0.022), a haze of 0.75% (0.047%/micron) and an average shrinkage of 1.9%.

Dielectric Loss Tangents versus frequency (from 100 to 100,000 Hz) were measured for the film of Example 13. At 1000 Hz, the film of Example 13 exhibits a Dielectric Loss Tangent of 0.0071. The frequency response of the Dielectric Loss Tangent is presented in FIG. 2B.

Example 14: Biaxially Oriented Film and Roll Made in Continuous Process

A cast web precursor analogous to Example 4 was made, except that 18 wt. % PVAc and 8 wt. % plasticizer was used with 73 wt. % PLA and 1% PLA slip masterbatch, specifically SUKANO DC S511 (as available from Sukano Polymers Corporation Duncan, S.C.).

The cast web was conveyed into a length orienter, preheated to initial temperature of over 114F and drawn 3.6×. The film was then conveyed into a conventional tenter, preheated to 151F and drawn transversely to a nominal draw ratio of 4.2. The film experienced a nominal strain reduction of about 0.7, heat set at 155° C., experienced another nominal strain reduction of about 0.1 resulting in a final nominal draw ratio of 3.4 before slitting and winding into a roll of film.

The resulting film was 50 microns thick and had measured haze of 0.64%. Refractive indices in MD, TD and z were measured at 632.8 nm to be 1.462, 1.463 and 1.453 respectively, resulting in an effective total birefringence of 0.026 (corresponding to a total birefringence of 0.019). MD and TD shrinkage were measured as 4.0% and 2.3% respectively. Mechanical testing at room temperature revealed an Elastic Modulus of 390 kpsia (2689 MPa), an Elongation-to-Break of 67% and a Break Strength of 27 kpsia (186 MPa) in the MD; and, an Elastic Modulus of 265 kpsia (1827 MPa), an Elongation-to-Break of 146% and a Break Strength of 25 kpsia (172 MPa) in the TD.

The oriented film was analyzed using DSC. The first midpoint Tg, associated with the PLA, polyvinyl acetate and plasticizer was 53.0° C. The second lower Tg was 17.2° C. Again, the oriented film was found to possess a very high level of crystallinity. Upon adjusting the crystallinity on a PLA wt. % basis, the crystallinity was found to be 48%. Thus, the Example film achieved a crystallinity in par with that for highly oriented pure PLA films on a PLA weight basis.

Figure 2B:
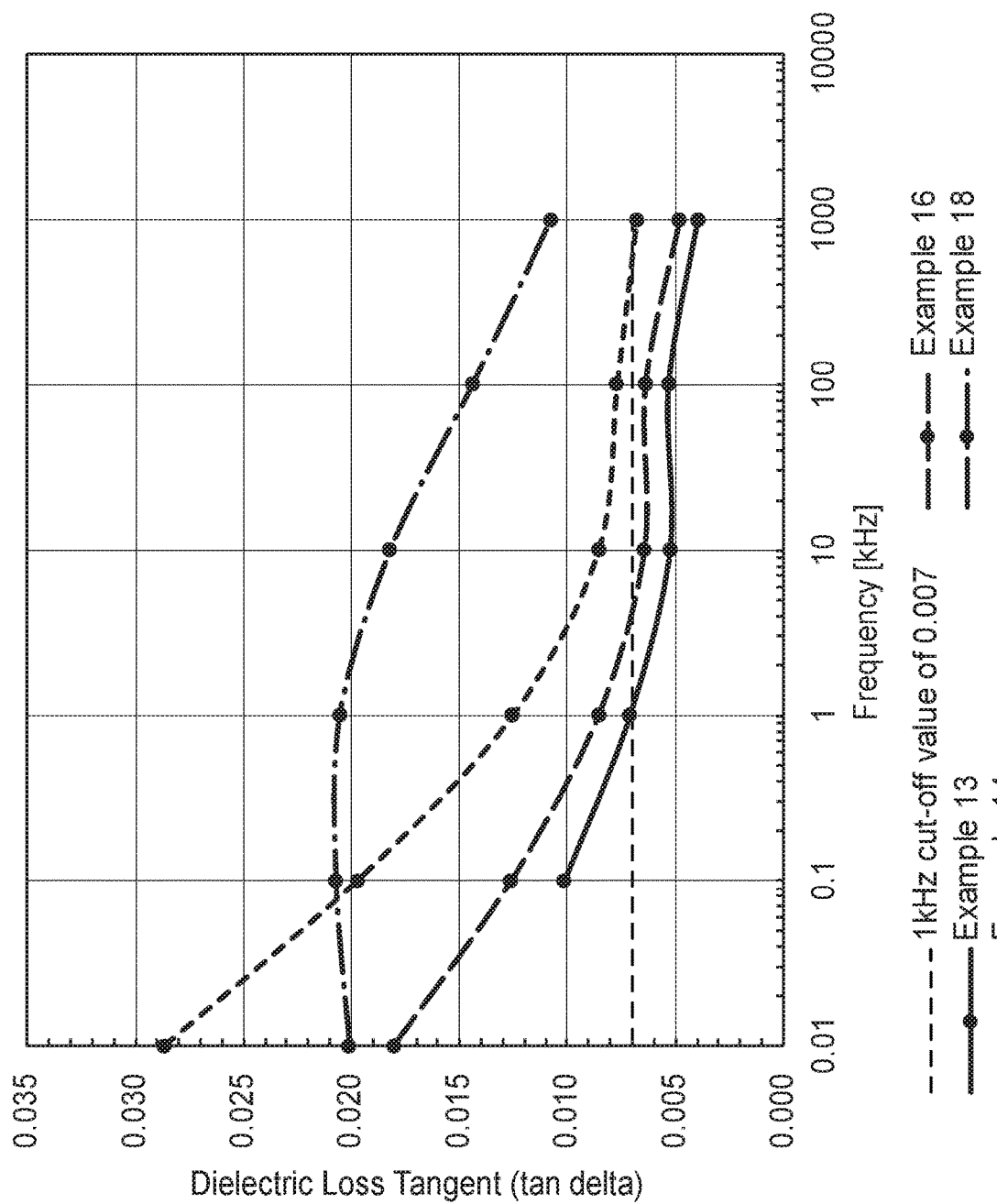

Dielectric Loss Tangents versus frequency (from 0.01 to 1,000 kHz, i.e. from 100 to 1,000,000 Hz) were measured for the film of Example 14 and are presented in FIG. 2B. At 1000 Hz, the film of Example 14 exhibited a Dielectric Loss Tangent of 0.01253.

Example 15: Uniaxially Oriented Film and Roll Made in Continuous Process

The cast web of Example 14 was conveyed into a length orienter, preheated to initial temperature of over 50° C. and drawn 1.15×. The film was then conveyed into a conventional tenter, preheated to approximately 57° C. and drawn transversely to a nominal draw ratio of 5.4. The film experienced a nominal strain reduction of 0.3 to a final draw ratio of 5.1, heat set at 155° C., and wound into a roll of film.

The resulting film was approximately 40 microns thick and had measured haze of 4.6%, i.e. 0.115%/micron. Refractive indices in MD, TD and z were measured at 632.8 nm to be 1.454, 1.470 and 1.453 respectively, resulting in an effective total birefringence of 0.024 (corresponding to a total birefringence of 0.018). MD and TD shrinkage were measured as 6.0% and 7.2% respectively. Mechanical testing at room temperature revealed an Elastic Modulus of 236 kpsia (1627 MPa), an Elongation-to-Break of 88% and a Break Strength of 3.5 kpsia (24 MPa) in the MD; and, an Elastic Modulus of 608 kpsia (4190 MPa), an Elongation-to-Break of 48% and a Break Strength of 30.4 kpsia (210 MPa) in the TD. The roll of film was hand tearable in the transverse direction with clean tear initiation and resisted tearing (e.g. exhibited anti-slivering) in the MD direction.

Examples 16 & 17: Alternative Plasticizer

Cast webs were made similarly to those of Examples 1 and 4, but substituting an alternative plasticizer, dibutyl phthalate, for Hallgreen-™ R8010, in similar proportions using the same relative weight percentages for the polylactic acid, polyvinyl acetate and plasticizer. These cast webs were stretched under procedures similar to Examples 6 and 9 to make Example films 16 and 17, respectively. The films were inserted into the pantograph gripping mechanism such that the MD direction of the cast roll was the same as the MD direction of the KARO IV™. The films were pre-heated at the stretch temperature of 60° C. for 120 seconds, and drawn simultaneously in MD and TD at a nominal initial rate of 100%/s to the peak draw ratios of 3 for both MD and TD. The films were then heat set at 155° C. for 20 seconds without strain relaxation. The samples were then quenched back to room temperature while still constrained for 30 seconds. Biaxial shrinkage measurements after 5 minutes at 120° C. were taken in accord with the previous examples and methods. The MD and TD averaged shrinkage over three samples were found to be 3.2% and 2.8% with standard deviations of 0.36% and 0.13% for Examples 16 and 17 respectively. Films 16 and 17 exhibited haze of 0.79% and 0.53%, respectively, with standard deviations of 0.015% and 0.006%, respectively. Thus the films comprising the higher molecular polyvinyl acetate again exhibited lower shrinkage simultaneously with lower haze than the films comprising the lower molecular weight polyvinyl acetate with this alternative plasticizer.

Accoustic measurements were taken on both Example films. The Dielectric Loss Tangent for Examples 16 and 17 at 1000 Hz were found to be 0.0086 and 0.0043 respectively. The frequency response of the Dielectric Loss Tangent Example 16 is presented in FIG. 2B.

Example 18: Low PLA Loading with Alternative Plasticizer 60%/25%/15%

A cast film comprising 60% PLA, 25% polyvinyl acetate and 15% Admex™ 6995 plasticizer (as available from the Eastman Chemical Co., Kingsport, Tenn.) was cast in analogy to the methods of the previous examples. Using the KARO-™ IV, the cast film were stretched to make an oriented film. Using the KARO-™ IV, the cast film was pre-heated at the stretch temperature of 65° C. for 120 seconds, and drawn simultaneously in MD and TD at a nominal initial rate of 100%/s to the peak nominal draw ratios of 4 for both MD and TD. The samples were then quenched back to room temperature. The true draw ratios were measured as 3.5 in each direction. The Effective Total Birefringence was found to be 0.023 (corresponding to a total birefringence of 0.017) with a refractive index in the thickness direction estimated as 1.458 at 589 nm. The total haze was found to be 2.1% (0.042%/micron). Acoustic measurements were taken and the resulting Dielectric Loss Tangent for was found to be 0.021 at 1000 Hz. The frequency response of the Dielectric Loss Tangent for Example 18 is presented in FIG. 2B.

Example 19: Tape Including Biaxially Oriented Film and Layers of Low Adhesion Backsize ("LAB"), Primer, and Hot-Melt Adhesive Film of Example 14 is rotogravure coated on one side with a low adhesion backsize (LAB) for adhesive release properties. After drying the LAB, a primer is rotogravure coated to the film side opposite that of the low adhesion backsize to improve bonding of the adhesive to the film. At a drying oven temperature of approximately 160° F., wrinkling of the film can occur. Drying at approximately 150° F. provides no wrinkling and a shrinkage of approximately ⅛ inch in the width, for a film originally measuring 6 inches in width. An acrylic adhesive is applied to the PLA film on the primer coated side at approximately 1 mil thick using a knife coating method. Adhesive drying conducted at 120-130° F. can provide no observable change in film dimensions or properties. The adhesive coated PLA film can be razor slit to 0.75 inch wide adhesive tape rolls.

Example 20: Tape Including Uniaxially Oriented Film and Layers of Low Adhesion Backsize ("LAB"), Primer, and Hot-Melt Adhesive Film of Example 15 is rotogravure coated on one side with a low adhesion backsize (LAB) for adhesive release properties. After drying the LAB, a primer is rotogravure coated to the film side opposite that of the low adhesion backsize to improve bonding of the adhesive to the film. At a drying oven temperature of approximately 160° F., wrinkling of the film can occur. Drying at approximately 150° F. provides no wrinkling and a shrinkage of approximately ⅛ inch in the width, for a film originally measuring 6 inches in width. An acrylic adhesive is applied to the PLA film on the primer coated side at approximately 1 mil thick using a knife coating method. Adhesive drying conducted at 120-130° F. can provide no observable change in film dimensions or properties. The adhesive coated PLA film can be razor slit to 0.75 inch wide adhesive tape rolls.

Materials

The following Table describes components which can be utilized in Examples 21-22.

TABLE

| Designation | Description | Source |
| --- | --- | --- |
| MA | Methyl acrylate | Arkema Inc., Philadelphia, PA |
| MMA | Methyl Methacrylate | Lucite International, Japan |
| AA | Acrylic acid | Arkema Inc., Philadelphia, PA |
| IOA | Isooctyl acrylate | Sigma Aldrich, St. Louis, MO |
| MAA | Methacrylic acid | Dow Chemical, Midland, MI |
| IRGACURE 651 | A photoinitiator | Ciba/BASF, Hawthorne, NY |
| IRGACURE 1076 | A photoinitiator | Ciba/BASF, Hawthorne, NY |
| IOTG | isooctyl thioglycolate, a chain transfer agent | Ciba/BASF, Hawthorne, NY |
| KF-2001 | A mercapto-functional silicone macromer ($M_W$ = 1000-15000) | Shin-Etsu Chemical Co, Tokyo, Japan |
| Crosslinker | Trimethylolpropane Triacrylate (TMPTA) Acrylic Ester with Scorch Retardant, available under the trade designation "SARET SR519HP" | Sartomer Americas, Exton, PA |

Example 21. Tape Including Biaxially Oriented Film and Layers of Low Adhesion Backsize ("LAB"), Primer, and Hot-Melt Adhesive The film of Example 14 is made into tape rolls by applying a primer, a low adhesion backsize ("LAB") coating, and hot melt acrylic adhesive. Air corona treatment, using conventional methods and apparatus to a dyne level of about 50 dynes/cm$^2$, is used on both sides of the oriented film to improve bonding of the primer and LAB.

For release properties, a solvent-based silicone acrylate low adhesive backsize (LAB) is used. The LAB is made from MA/MMA/MAA/KF-2001 in ratios of 60/10/5/25. The reaction is run in methyl ethyl ketone, using procedures generally similar to those described in Examples (e.g., the LAB-Si—R in Table 2) of U.S. Published Patent Application No. 2014/0138025. The LAB is applied to the oriented film backing using a direct gravure roll at a usage rate of about 1.2 gallons/1000 sq yds (~5.4 liters/1000 m$^2$) and drying at 150° F. (~66° C.).

A primer layer (3M TAPE PRIMER 94) is applied to the oriented film using a direct gravure roll at a usage rate of about 1.5 gallons/1000 sqyds (~6.8 liters/1000 m$^2$) and then drying at 150° F. (66° C.).

A hot melt acrylic PSA (comprising 98.25 parts by weight of IOA, 1.75 parts by weight of AA, 0.015 parts by weight of IOTG, 0.15 parts by weight of IRGACURE 651, and 0.04 parts by weight of IRGACURE 1076) is prepared using the procedure generally similar to the description in Example 1 of U.S. Pat. No. 6,294,249, and is coated over the primer side of the oriented film backing. The hot melt acrylic adhesive contains UV stabilizers, antioxidants, E-beam co-agents (scorch-retarded TMPTA), DOTP plasticizer, and tackifying resins in order to improve the performance of the masking tape. A twin screw extruder is used to blend the components and coat the hot melt acrylic adhesive mixture onto the oriented film backing via rotary rod die at a coat weight of 9.5 grains per 24 sqi (40 g/m$^2$). The coated adhesive is irradiated with low voltage E-beam at dose of 4.0 Mrad to provide a cured tape.

The thus-coated oriented film backing is then converted into tape rolls via score slitting techniques.

Example 22. Tape Including Uniaxially Oriented Film and Layers of Low Adhesion Backsize ("LAB"), Primer, and Hot-Melt Adhesive The film of Example 15 is made into tape rolls by applying a primer, a low adhesion backsize ("LAB") coating, and hot melt acrylic adhesive. Air corona treatment, using conventional methods and apparatus to a dyne level of about 50 dynes/cm$^2$, is used on both sides of the oriented film to improve bonding of the primer and LAB.

For release properties, a solvent-based silicone acrylate low adhesive backsize (LAB) is used. The LAB is made from MA/MMA/MAA/KF-2001 in ratios of 60/10/5/25. The reaction is run in methyl ethyl ketone, using procedures generally similar to those described in Examples (e.g., the LAB-Si—R in Table 2) of U.S. Published Patent Application No. 2014/0138025. The LAB is applied to the oriented film backing using a direct gravure roll at a usage rate of about 1.2 gallons/1000 sq yds (~5.4 liters/1000 m$^2$) and drying at 150° F. (~66° C.).

A primer layer (3M TAPE PRIMER 94) is applied to the oriented film using a direct gravure roll at a usage rate of about 1.5 gallons/1000 sqyds (~6.8 liters/1000 m$^2$) and then drying at 150° F. (66° C.).

A hot melt acrylic PSA (comprising 98.25 parts by weight of IOA, 1.75 parts by weight of AA, 0.015 parts by weight of IOTG, 0.15 parts by weight of IRGACURE 651, and 0.04 parts by weight of IRGACURE 1076) is prepared using the procedure generally similar to the description in Example 1 of U.S. Pat. No. 6,294,249, and is coated over the primer side of the oriented film backing. The hot melt acrylic adhesive contains UV stabilizers, antioxidants, E-beam co-agents (scorch-retarded TMPTA), DOTP plasticizer, and tackifying resins in order to improve the performance of the masking tape. A twin screw extruder is used to blend the components and coat the hot melt acrylic adhesive mixture onto the oriented film backing via rotary rod die at a coat weight of 9.5 grains per 24 sqi (40 g/m$^2$). The coated adhesive is irradiated with low voltage E-beam at dose of 4.0 Mrad to provide a cured tape.

The thus-coated oriented film backing is then converted into tape rolls via score slitting techniques.

What is claimed:

1. A film comprising a mixture of
   50 to 80 wt.-% of semicrystalline polylactic acid polymer(s);
   5 to 40 wt.-% of polyvinyl acetate polymer having a glass transition temperature (Tg) midpoint, as measured by differential scanning calorimetry, of at least 25° C.; and
   1 to 20 wt.-% plasticizer; and
   wherein the film is oriented and the dielectric loss tangent at 1 kHz is at least 0.007.

2. The film of claim 1 wherein the polyvinyl acetate polymer has a Tg midpoint no greater than 50° C.

3. The film of claim 1 wherein the polyvinyl acetate polymer has a molecular weight ranging from 50,000 g/mol to 1,000,000 g/mol.

4. The film of claim 1 wherein the film is biaxially oriented.

5. A film of claim 1 wherein the dielectric loss tangent is at least 0.007 for frequencies ranging from 20 to 20,000 Hz.

6. The film of claim 1 wherein the oriented film exhibits a 5 minute shrinkage at 120° C. of less than 3%.

7. The film of claim 1 wherein the oriented film exhibits a haze of less than 0.1%/micron thickness.

8. The film of claim 1 wherein the oriented film exhibits a z-direction refractive index of greater than 1.455 at 589 nm or a total birefringence of at least 0.005.

9. The film of claim 1 wherein the film is uniaxially oriented.

10. The film of claim 9 wherein the oriented film is hand-tearable.

11. The film of claim 1 wherein the oriented film is a monolithic film or a film layer of a multilayer film.

12. The film of claim 1 wherein the mixture exhibits a single Tg and the single Tg midpoint ranges from 40° C. to 65° C.

13. The film of claim 1 wherein the oriented film exhibits a first Tg midpoint ranging from 40° C. to 65° C. and a second Tg midpoint ranging from 5 to 25° C.

14. The film of claim 1 wherein the mixture exhibits less than 5% crystallinity.

15. The film of claim 1 wherein the oriented film exhibits 10 to 60% crystallinity.

16. An article comprising the film of claim 1 and an adhesive disposed proximate a major surface of the film.

* * * * *